(12) United States Patent
Saputra et al.

(10) Patent No.: US 12,217,470 B2
(45) Date of Patent: Feb. 4, 2025

(54) SYSTEM AND METHOD FOR AUTOMATIC VIDEO RECONSTRUCTION WITH DYNAMIC POINT OF INTEREST

(71) Applicant: SAMSUNG ELECTRONICS CO., LTD., Suwon-si (KR)

(72) Inventors: Muchlisin Adi Saputra, Jakarta (ID); Shah Dehan Lazuardi, Jakarta (ID); Billy Gunawan, Jakarta (ID); Irfan Yunus Pramono, Jakarta (ID); Soma Wiraga Saniscara, Jakarta (ID); Junaidillah Fadlil, Jakarta (ID)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 406 days.

(21) Appl. No.: 17/698,309

(22) Filed: Mar. 18, 2022

(65) Prior Publication Data
US 2022/0207851 A1 Jun. 30, 2022

Related U.S. Application Data

(63) Continuation of application No. PCT/KR2021/019960, filed on Dec. 27, 2021.

(30) Foreign Application Priority Data

Dec. 28, 2020 (ID) .............................. P00202010669

(51) Int. Cl.
*G06V 10/20* (2022.01)
*G06V 10/22* (2022.01)
(Continued)

(52) U.S. Cl.
CPC .......... *G06V 10/235* (2022.01); *G06V 10/255* (2022.01); *G06V 20/41* (2022.01);
(Continued)

(58) Field of Classification Search
CPC .... G06V 10/235; G06V 10/255; G06V 20/41; G06V 20/46; G06V 20/49; G06V 10/25;
(Continued)

(56) References Cited

U.S. PATENT DOCUMENTS 6,611,803 B1 8/2003 Furuyama et al.
9,916,864 B2 3/2018 An
(Continued)

FOREIGN PATENT DOCUMENTS

KR 10-2252072 B1 5/2021
WO 2019/112642 A1 6/2019

OTHER PUBLICATIONS

Xu et al., "Deep Flow-Guided Video Inpainting," Computer Vision Foundation, pp. 3723-3732, Jun. 15, 2019.
(Continued)

*Primary Examiner* — Neil R Mclean
(74) *Attorney, Agent, or Firm* — Sughrue Mion, PLLC

(57) ABSTRACT

A system and a method for an automatic video reconstruction to improve scene quality using a dynamic point of interest by finding a point or line of interest are provided. The method includes dividing a first video into a plurality of first frames; determining a first object of interest in the plurality of first frames; converting the plurality of first frames into a plurality of second frames based on the first object of interest; and reconstructing the first video into a second video based on the plurality of second frames.

15 Claims, 21 Drawing Sheets

(51) Int. Cl.
  *G06V 20/40* (2022.01)
  *G10L 15/26* (2006.01)
(52) U.S. Cl.
  CPC .............. *G06V 20/46* (2022.01); *G06V 20/49* (2022.01); *G10L 15/26* (2013.01)
(58) Field of Classification Search
  CPC ........ G06V 10/82; G06V 20/52; G06V 20/70; G06V 30/19; G10L 15/26; G11B 27/002; G11B 27/031; H04N 21/23412; H04N 21/23418; H04N 21/234318; H04N 21/234345; H04N 21/23439; H04N 21/8405; H04N 21/845; H04N 21/854
  USPC ........................................................ 382/103
  See application file for complete search history.

(56) References Cited

U.S. PATENT DOCUMENTS

| | | | |
|---|---|---|---|
| 10,515,463 B2 | 12/2019 | Takeda et al. | |
| 10,834,465 B1 | 11/2020 | Kansara et al. | |
| 11,113,587 B2 * | 9/2021 | Butt | G06N 20/00 |
| 11,184,558 B1 * | 11/2021 | Zhang | G06V 20/41 |
| 2011/0193993 A1 | 8/2011 | Yeom et al. | |
| 2017/0147867 A1 | 5/2017 | Pradeep | |
| 2017/0337692 A1 | 11/2017 | Romanenko et al. | |
| 2019/0075237 A1 | 3/2019 | Cheung | |
| 2019/0130165 A1 | 5/2019 | Seshadri et al. | |
| 2020/0020071 A1 | 1/2020 | Frey et al. | |
| 2020/0218901 A1 | 7/2020 | Elder et al. | |
| 2020/0304754 A1 | 9/2020 | Huynh Thien et al. | |
| 2021/0144442 A1 * | 5/2021 | Liu | G06N 3/045 |

OTHER PUBLICATIONS

International Search Report dated Apr. 26, 2022, issued by the International Searching Authority in counterpart International Application No. PCT/KR2021/019960 (PCT/ISA/210).

Extended European Search Report dated Apr. 19, 2024, issued by the European Patent Office in European Application No. 21915727.8.

* cited by examiner

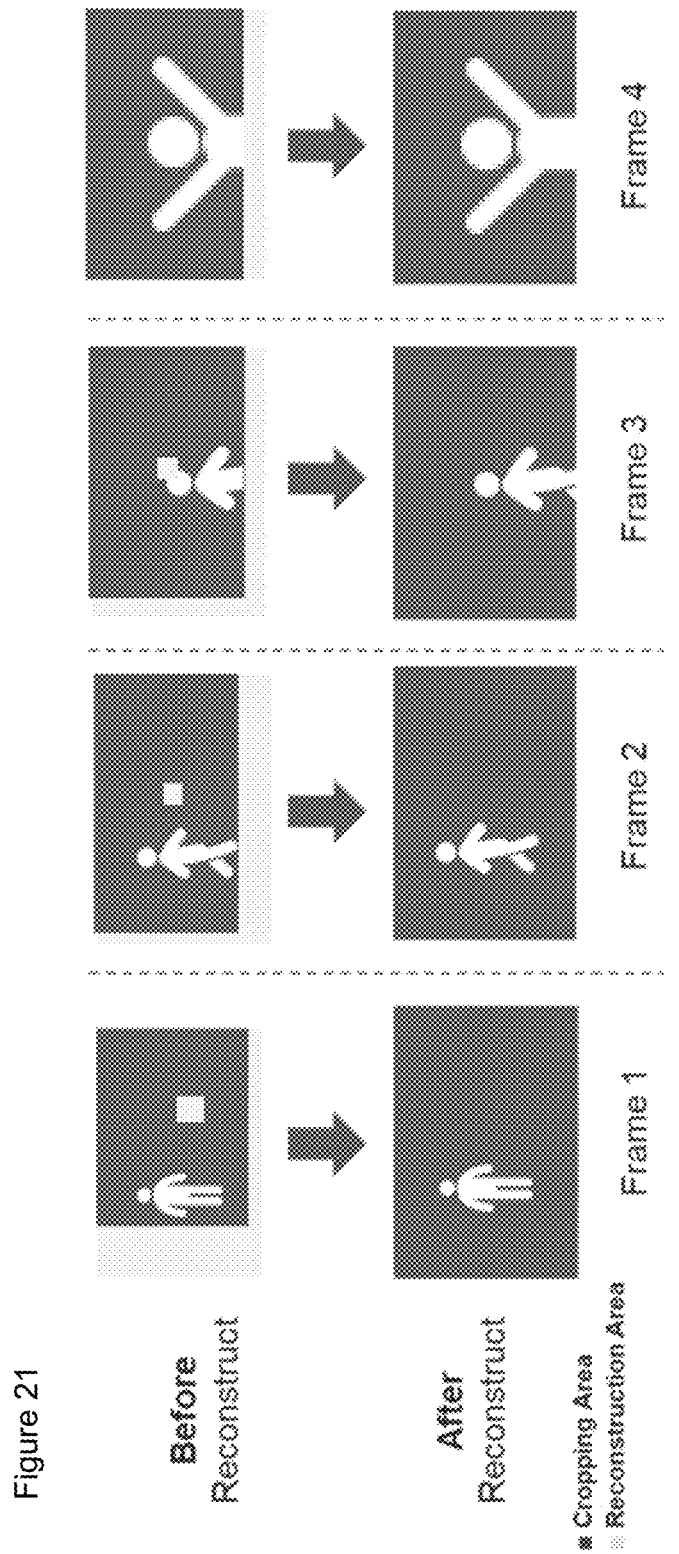

SYSTEM AND METHOD FOR AUTOMATIC VIDEO RECONSTRUCTION WITH DYNAMIC POINT OF INTEREST

CROSS-REFERENCE TO RELATED APPLICATIONS

This application is a by-pass continuation application of International Application No. PCT/KR2021/019960, filed on Dec. 27, 2021, which claims priority to Indonesian Patent Application No. P00202010669, filed on Dec. 28, 2020, in the Indian Patent Office, the disclosures of which are incorporated by reference herein in their entireties.

BACKGROUND

1. Field

The disclosure relates generally to a system and a method to improve scene quality of a video by automatically reconstructing the video using a dynamic point of interest. More specifically, the disclosure relates to a system and a method for automatically reconstructing a video by finding a point or line of interest or using a user's predefined object of interest, automatically identifying the best area for cropping, and then performing reconstruction automatically.

2. Description of the Related Art

The use of a camera has become an integral part in the daily lives of consumers. Consumer demand and availability of new technology has a big impact on development of a smartphone camera. The rise of social media platforms also helped to expand the function of camera as a tool to connect with other people, promote and share perspectives. The smartphone camera has started to replace a traditional digital camera and have now become the primary tool for numerous activities that utilize photo and video contents. This is driven by the vast change of consumer needs in terms of visual contents, such as photos, videos, etc.

Capturing video has its own challenges and pain points that the consumers need to deal with. There are limitations when taking video and editing using a smartphone. Most often, the result of the video is not as expected. Factors such as instability when holding the camera, poor audio quality, low resolution, finding object focus using the rule of thirds/golden ration, and aspect ratio make video editing a very difficult task to do. Tracking object to focus on can be difficult when it is done manually. In addition, removing unwanted objects accidentally captured in the video and fixing cropped video are also difficult, and considered as impossible without proper video editing skills.

SUMMARY

Example embodiments of the disclosure provide a system and a method for automatically performing video reconstruction with a dynamic point of interest by finding a point or line of interest that may be used as a reference in the composition rules or using a user's predefined focus object (or an object of interest), automatically identifying the best area for cropping and then performing reconstruction automatically, including removing unwanted object in the video.

According to an aspect of an example embodiment, there is provided a method of automatically generating video reconstruction, the method including: dividing a first video into a plurality of first frames; determining a first object of interest in the plurality of first frames; converting the plurality of first frames into a plurality of second frames based on the first object of interest; and reconstructing the first video into a second video based on the plurality of second frames.

The dividing the first video may include dividing the first video into a plurality of scenes based on images included in the first video or a text externally input, and the determining the first object of interest may include detecting a second object included in the plurality of scenes and tracking the second object; and classifying a foreground and a background in the plurality of scenes, and determining the second object as the object of interest based on a result of the classifying.

The dividing the first video into the plurality of scenes may include: detecting voices included in the plurality of first frames through automatic speech recognition (ASR), and converting the voices into text; dividing the images included in the plurality of first frames based on at least one of a color, a shape, or a gradation of each of the images; and generating a feature vector for each of the converted text and the divided images, and dividing the first video into the plurality of scenes based on the feature vector.

The determining the first object of interest may include determining the first object of interest based on an intent recognition and an entity recognition.

The converting the plurality of first frames may include: extracting at least one of a point of interest or a line of interest for a third object included in a first frame of the plurality of first frames; and cutting the third object included in the first frame or reconstructing the first frame based on the at least one of the point of interest or the line of interest.

The reconstructing the first frame may include: fitting a template to the first frame, the template including five points and three straight lines; and moving the template such that the point of interest or the line of interest is adjacent to or coincides with the five points or the three straight lines.

The converting the plurality of first frames may include: removing a partial region of a first frame of the plurality of first frames; generating a second frame of the plurality of second frames by painting a missing area resulted from removal of the partial region; and arranging adjacent second frames by applying in-painting and flow estimation to the plurality of second frames.

According to an aspect of an example embodiment, there is provided system for automatically generating video reconstruction, the system including: a display configured to output a first video, and output a second video in which the first video is reconstructed; and a processor configured to process data for the first video and reconstruct the second video, wherein the processor is further configured to divide the first video into a plurality of first frames, determine a first object of interest from the plurality of first frames, and divide the plurality of first frames into a plurality of second frames based on the first object of interest, and reconstruct the first video into the second video based on the plurality of second frames.

The processor may be further configured to divide the first video into a plurality of scenes based on images included in the first video or a text externally input; detect a second object included in the plurality of scenes and tracking the second object; and classify a foreground and a background in the plurality of scenes, and determining the second object as the first object of interest based on a result of classification.

The processor may be further configured to detect voices included in the plurality of first frames through automatic speech recognition (ASR), and converting the voices into text, divide the images included in the plurality of first frames based on at least one of a color, a shape, or a gradation of each of the images; and generate a feature vector for each of the converted text and the divided images, and divide the first video into the plurality of scenes based on the feature vector.

The processor may be further configured to determine the first object of interest based on an intent recognition and an entity recognition.

The processor may be further configured to extract at least one of a point of interest or a line of interest for a third object included in a first frame of the plurality of first frames; and cut the third object included in the first frame or reconstructing the first frame based on the at least one of the point of interest or the line of interest.

The processor may be further configured to fit a template to the first frame, the template including five points and three straight lines; and move the template such that the point of interest or the line of interest is adjacent to or coincides with the five points or the three straight lines.

The processor may be further configured to remove a partial region of a first frame of the plurality of first frames, generate a second frame of the plurality of second frames by painting a missing area resulted from removal of the partial region; and arrange adjacent second frames by applying in-painting and flow estimation to the plurality of second frames.

According to an aspect of an example embodiment, there is provided a computer program product including a non-transitory computer-readable medium storing instructions that, when executed by at least one hardware processor, cause the at least one hardware processor to perform operations including: dividing a first video into a plurality of first frames; determining an object of interest in the plurality of first frames; converting the plurality of first frames into a plurality of second frames based on the object of interest; and reconstructing the first video into a second video based on the plurality of second frames.

BRIEF DESCRIPTION OF THE DRAWINGS

The above and other aspects, features, and advantages of embodiments of the disclosure may be more apparent from the following description taken in conjunction with the accompanying drawings, in which:

FIG. 21 is a diagram illustrating video frame reconstruction according to an example embodiment of the disclosure.

DETAILED DESCRIPTION

Hereinafter, embodiments of the inventive concept may be described in detail with reference to the accompanying drawings. It is to be understood that the embodiments of the disclosure herein described are merely illustrative of the application of the principles of the disclosure. Reference herein to details of the illustrated embodiments is not intended to limit the scope of the claims.

Figure 1:
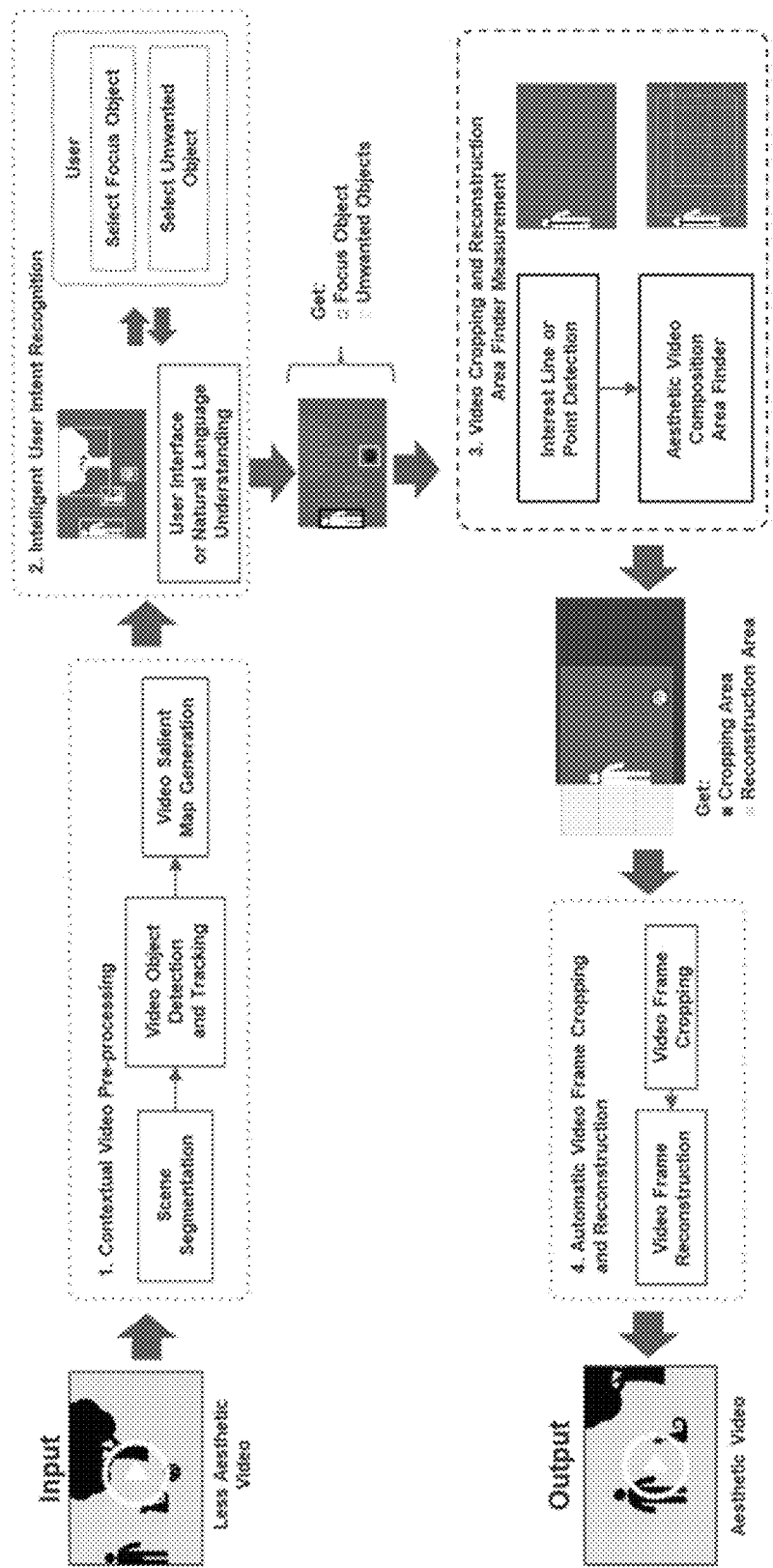
FIG. 1 illustrates a system for automatic video reconstruction according to an example embodiment of the disclosure.

Referring to FIG. 1, a system for automatic video reconstruction with a dynamic point of interest, hereinafter referred as automatic video reconstruction, in accordance with an example embodiment of the disclosure is described. As described in FIG. 1, the system may include four modules for contextual video pre-processing, intelligent user intent recognition, video cropping and reconstruction area finder measurement, and automatic video frame cropping and reconstruction. The contextual video pre-processing module may split a full video into segmented scenes containing paired image and text, detect and track an object's movement in each scene, generate a video saliency map to produce separated images between the object and a background. The intelligent user intent recognition module may enable a user to adjust an editing result, such as selecting an unwanted object to delete or changing a focus object (or an object of interest). The video cropping and reconstruction area finder measurement module may apply video cropping and reconstruction area finder measurement by cropping video frame and finding an aesthetic video composition area. According to an example embodiment, the nearest point or line is obtained based on a predefined composition rule by gathering all the interesting point or line (or point or line of interest) from an object, and set the nearest point or line as a focal point to be intersected with the image composition rules. The video cropping and reconstruction area finder measurement module is used to identify which area in the video frame is suitable to be cropped and needs to be reconstructed. The automatic video frame cropping and reconstruction module is the video frame cropping and reconstruction by estimating the flow of video and applying video inpainting to reconstruct missing regions in order to complete the whole frame of the video.

Referring to TABLE 1 below, examples of implementing embodiments of the disclosure are described. The embodiments of the disclosure may be used for both post recording and during recording. For post recording, the video editing is based on object detection in which a user may use touch screen interaction, text-based editing, and multiple scenes editing. While during recording, recommendations may be provided to the user to zoom on a focused object or a camera angle. For example, various cases of using automatic video reconstruction according to an example embodiment, which may be described below with reference to FIGS. 2-9.

TABLE 1

| Post recording | During recording |
| --- | --- |
| Video editing based on object detection. | Gives recommendation to user based on object detection |
| Editing type | Recommendation examples |
| Touch screen interaction | Zoom on focused object |
| Text-based | Camera angle |
| Multiple scenes editing | |

Figure 2:
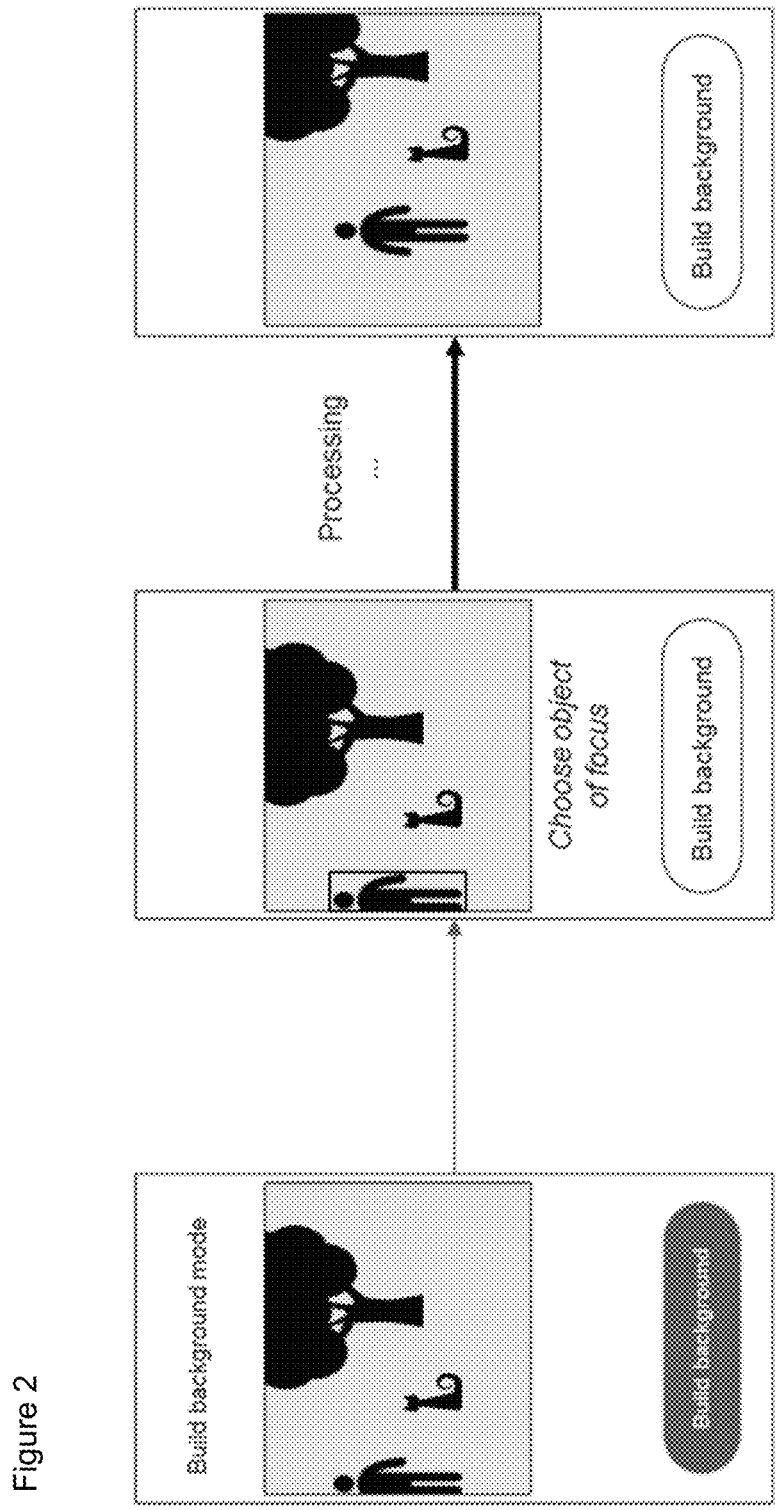
FIG. 2 illustrates an example of performing automatic video reconstruction based on a selected object according to an example embodiment of the disclosure.

Referring to FIG. 2, an example of using automatic video reconstruction according to an example embodiment to edit a video of an object is described. Recording a video has become an easy task in everyday life, but not all users have the skills to record a video with satisfactory quality (e.g., good angle and background). An intended object to focus in the video may be misaligned or incomplete. For example, when recording a video of a person in front of a crowded tourist scene, the camera may focus to other person or objects, or the person is incompletely captured because of the recording angle. An example embodiment provides a method to reconstruct and fix the video by reconstructing the incomplete object and realign the object properly. According to an example embodiment, a new background of the video that matches the background on the rest of the video is generated.

When a video shows that a person appears incomplete in the video frame and/or the view is considered unaesthetic, the user may use the automatic video reconstruction according to an example embodiment by, for example, tapping on a "Build Background" button. The user may choose a focal object to focus on the video. By using the focal object, the system may calculate the best view, and reconstruct the missing (or incomplete) object and missing background from the video. As a result, the user may receive improved video playback with reconstructed object and background.

Figure 3:
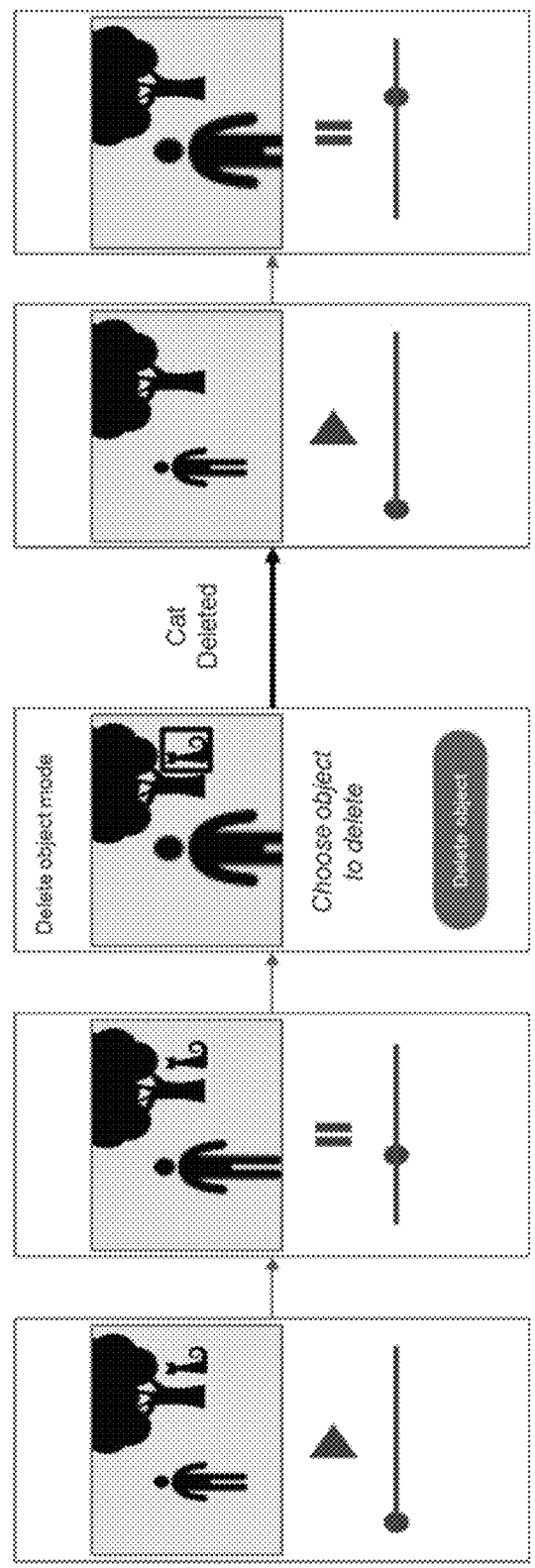
FIG. 3 illustrates an example of deleting an object according to an example embodiment of the disclosure.

Referring to FIG. 3, an example of using automatic video reconstruction to delete an object in a video. When recording a video, a controlled environment is ideal but it is sometimes difficult to achieve. For example, an object such as a person or an animal may pass by and be recorded in the middle or during the last minute of the recording. Repeating the recording process without the intrusion is troublesome and time-consuming. The automatic video reconstruction according to an embodiment allows a user to delete an unwanted object in the video, instead of retaking the video without the unwanted object, thereby saving time and increasing productivity. Instead of recording the same scene again, a user may continue to record another scene. For example, a cat accidentally appears in the video when it is not supposed to be there. A user may choose a "Delete an Object" option in an editing mode, and select the cat to delete. The automatic video reconstruction according to an embodiment may delete the selected object and build the background behind the deleted object (that is, the new background replaces the deleted object). As a result, the selected object no longer appears in the reconstructed video.

Figure 4:
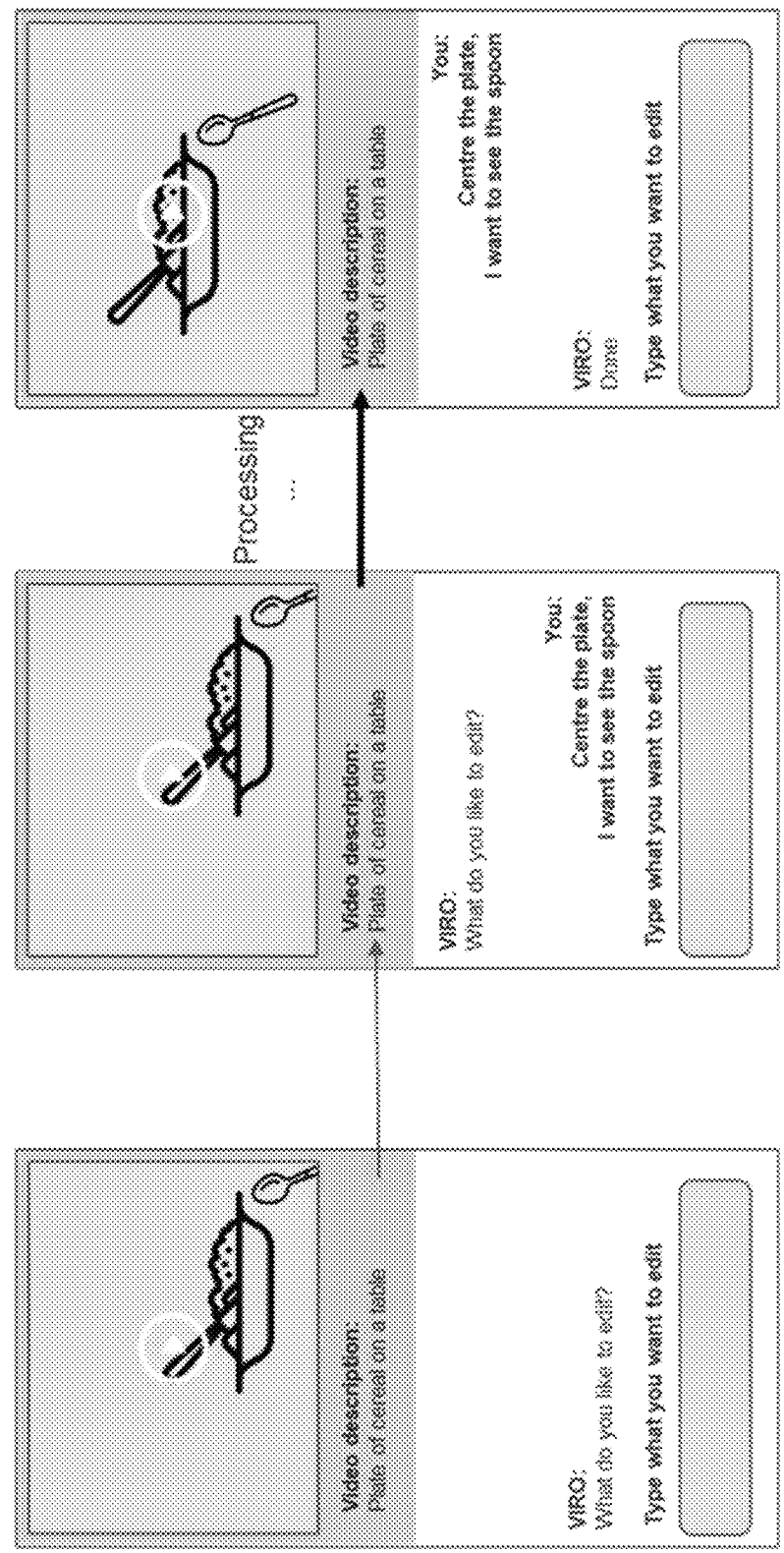
FIG. 4 illustrates an example of video editing using text according to an example embodiment of the disclosure.

Referring to FIG. 4, an example of using automatic video reconstruction according to an example embodiment to edit a video using text message is described. The use of text messaging, or known as chatting, has become an essential task in our everyday life. People rely on text messaging to do many things, such as from asking someone's help to collaborate on a group task. The disclosure enables a user to reconstruct video not only in a normal editing environment, but also in a chat room environment. Accordingly, a user is enabled to edit faster, by interacting with a chatbot that works as an editor assistant, called as VIRO (Video Reconstruction Bot). With the growing trend of multi-tasking, editing by text allows a user to finish more tasks in a short period of time. For example, a user may edit a video while chatting with a group of friends to discuss the editing process. This enables a user to switch task faster between chatting and editing video.

As shown in FIG. 4, a user may interact with VIRO to edit a video when the object of the video is not aligned in the center. VIRO may ask the user to enter an editing command. The user may type a command in the chat box, for example, to realign the focused object of a plate of food, in the center of the video. The disclosure then aligns the plate in the center of the video, and builds the missing pictures that the video does not have. For the alignment process, the disclosure may maintain the aesthetic terms of the video. The result shown the plate is aligned to the center of the video after the reconstruction.

Figure 5:
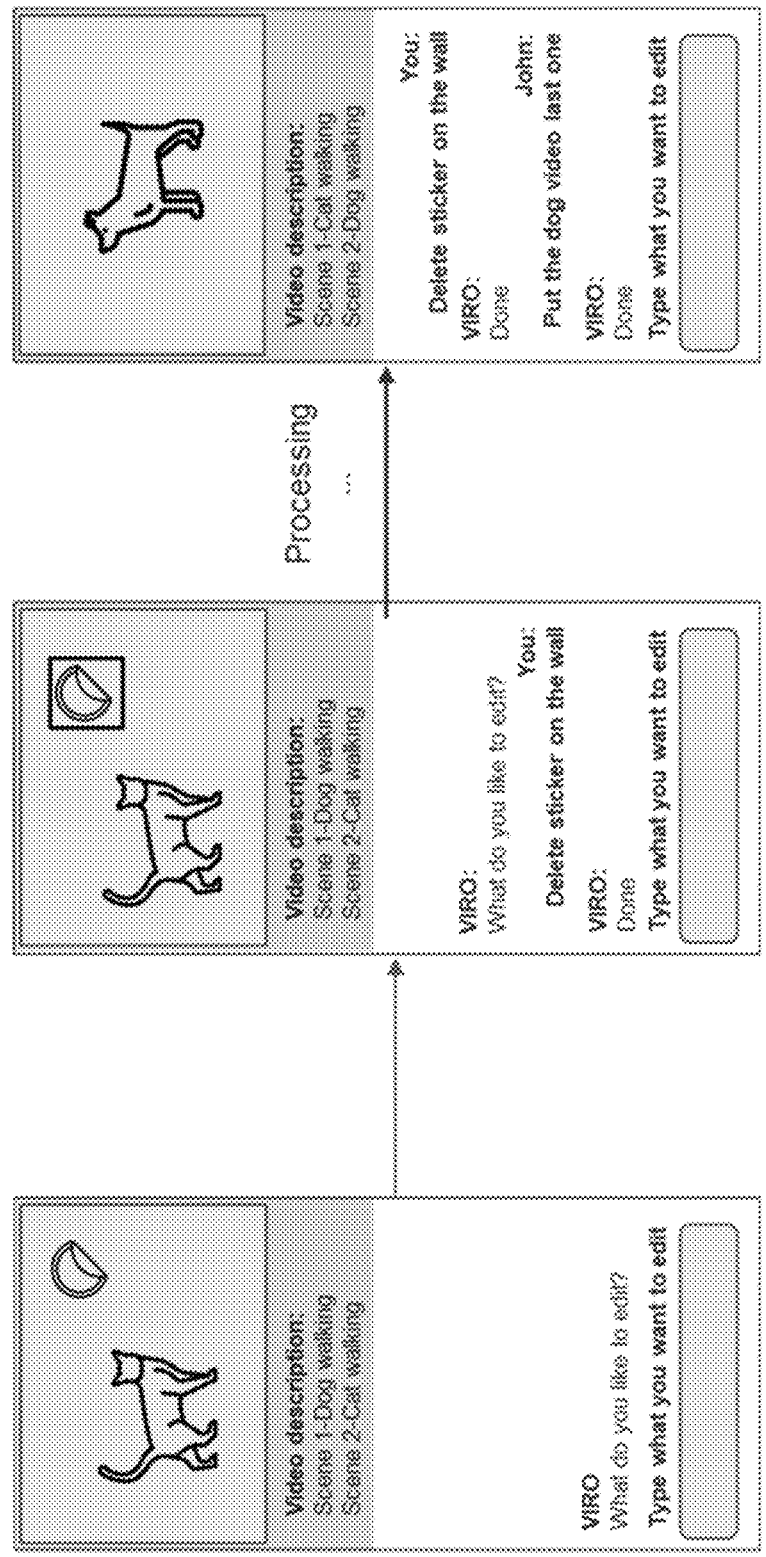
FIG. 5 illustrates an example of group text editing according to an example embodiment of the disclosure.

Referring to FIG. 5, an example of using automatic video reconstruction according to an embodiment for group editing using text is described. Group collaboration is widely used using text messaging these days, where people may assign tasks and discuss solutions on a chatroom. The disclosure enables video reconstruction via chat room environment for a group of people, which allows them to edit video faster and collaboratively. Instead of waiting for a single person to edit the video and show his/her friend the editing result repeatedly, the group may collaborate in editing the video via chat environment according to an embodiment of the disclosure. The editor assistant, e.g., VIRO, may help to moderate the editing request. The disclosure enables the group of users to edit the video faster by removing the burden on a single person, and help to prevent miscommunication between the group of users.

For example, there are multiple users collaborating to edit the same video using group text with chatbot VIRO. The group intends to edit the video using a collaboration platform. A users may input various commands via chat box to VIRO. One of the users may ask VIRO to delete an object on the background of the video, and the disclosure deletes the requested object according to the instruction. When another user asks to put a certain scene as the last scene, the disclosure relocates the requested scene and VIRO informs that the request is completed.

Figure 6:
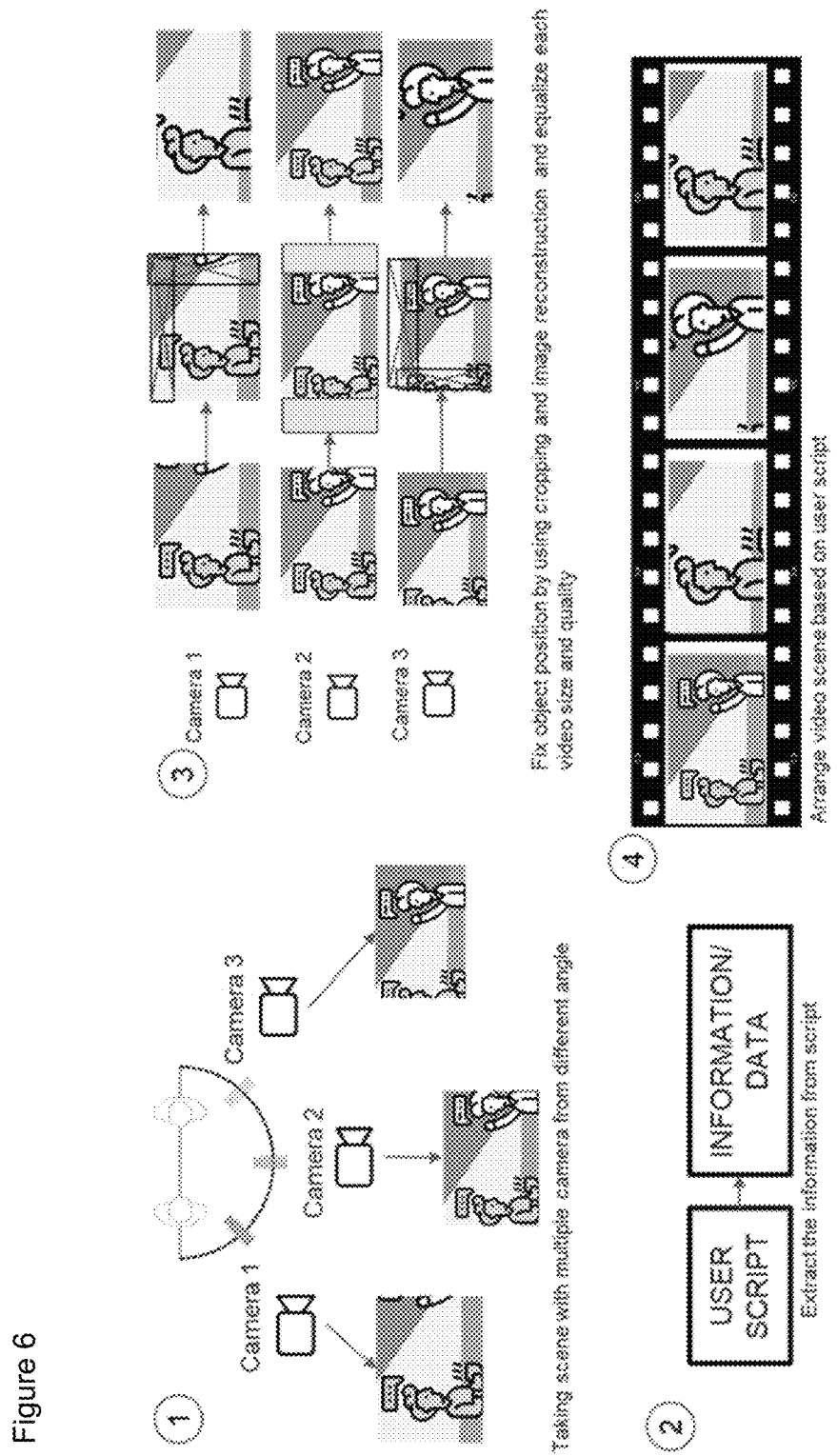
FIG. 6 illustrates an example of editing using multiple camera according to an example embodiment of the disclosure.

Referring to FIG. 6, an example of using automatic video reconstruction for editing multiple scenes taken from multiple cameras is described. Filmmaking typically requires many people and a high budget, which may only be afforded by film studios. It may be unaffordable for individuals and amateur filmmakers who are learning about filmmaking. However, the advancement of technology has made filmmaking more affordable to many people. As the price of equipment becomes more affordable and software technology becomes more advanced, filmmaking may even be done using a smartphone. Nevertheless, the use of a smartphone for filmmaking is not easy due to limitations and the lack of features that may be available on specialized devices. For example, a scene is generally taken from multiple angles and later edited to fit the narrative of the video. A group of people may be able to record the same scene from multiple angles using their devices, but each device may have different specifications and produce different video quality. This may result to lower productivity as it needs more time and effort to edit the video. The disclosure may be utilized to handle the tedious part that comes with having limited budget, and gives beginner filmmakers more time to think on the creative aspect of the filmmaking process. The multiple scenes editing process may be easier and faster by using automatic video reconstruction according to the disclosure in various ways, such as reconstructing a video with a different resolution and/or aspect ratio by adjusting an object's position and equalizing the size and quality of each video, or arranging video scene order based on a user's script by identifying the speaker in each scene.

As seen in FIG. 6, the process begins with recording the video from a different angle using multiple devices. There is 180-degree rule in cinematography where multiple cameras are placed on one side of an imaginary axis between two characters. Each camera may have different focus where one camera records multiple actors while the other cameras only record single actor. To configure the automatic video reconstruction according to the disclosure, user may input which object they want to focus on. The form of the input varies based on the application. It may be in the form of text input or selecting the object by touch. The input may be processed by the system and then applied to the video. Multiple videos are recorded in different aspect ratio and resolution since it was recorded using different camera devices. Based on the user input, the automatic video reconstruction of the disclosure may determine the best position for the object and reconstruct a side part of the image that is missing when the object position is rearranged. The automatic video reconstruction of the disclosure also readjusts an image aspect ratio and a resolution to make all the scenes share the same size. The last part of the video editing is ordering the scene. Based on the previous user input, the system may recognize the actor in each scene and determine which scene should appear according to the script inputted by the user.

Figure 7:
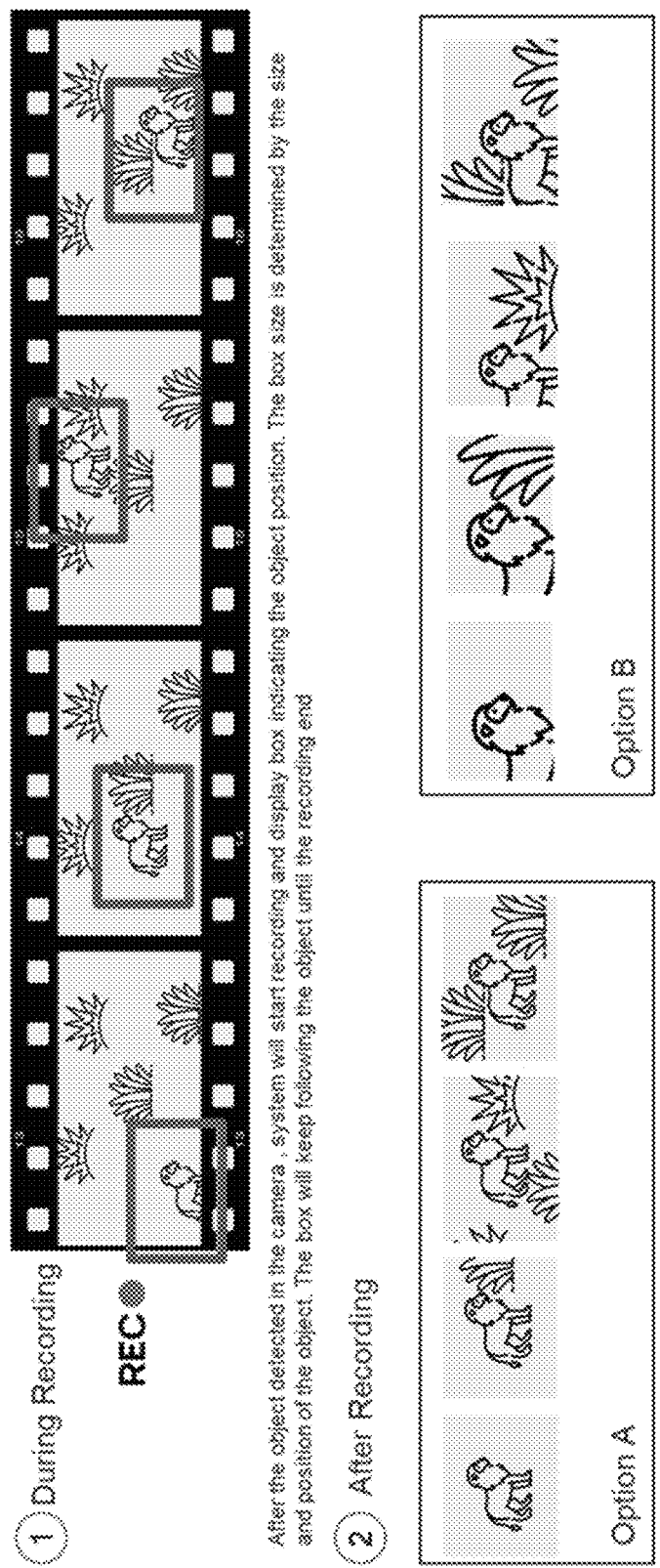
FIG. 7 illustrates an example of auto zooming on focused object according to an example embodiment of the disclosure.

Referring to FIG. 7, an example of using automatic video reconstruction to auto zoom on a focused object. The automatic video reconstruction system of the disclosure may assist a user when recording a video of the focused object by detecting the object and perform auto zoom on the intended object. The ability to perform auto zoom and record the object in a desirable angle is very useful for people who want to record unique moments in their lives. For example, the disclosure may be used to record a wild animal and perform detection on the focused animal. A user may choose which object to focus on before recording. The method of input varies, depending on the application. For example, a user may input to select the object to focus by text or by touching an image of the object shown on the screen. During recording, the system may highlight the object selected to focus, so the user may track the object on a camera easier. After recording, the automatic video reconstruction of the disclosure may perform reconstruction on the video and create multiple variations of the video. The system of the disclosure may then recommend the variation as reconstructed video selection to user. A user may choose one or more videos from the recommendations, which the user considers as the best result and save the video.

Figure 8:
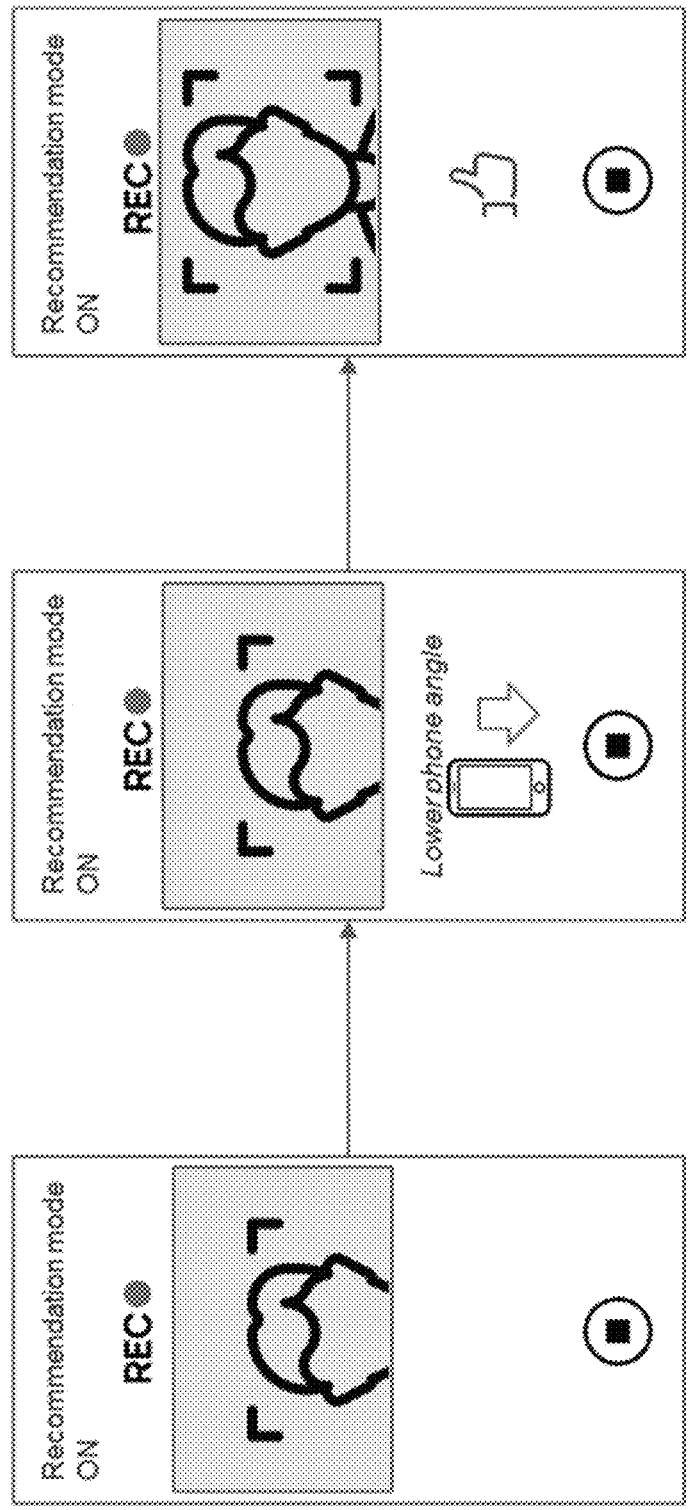
FIG. 8 illustrates an example of camera angle recommendation according to an example embodiment of the disclosure.

Referring to FIG. 8, describes an example of using automatic video reconstruction for camera angle recommendation. The disclosure may assist a user by providing a recommendation on a camera angle for the selected object. Even people with low basic video recording skill may be able to record a decent video, but the camera angle may not be the best. According to the disclosure, the camera may detect the recorded object and analyze the best angle, depending on the type of the object. A user may choose which object to focus on before recording. The method of input varies depending on the application. For example, user may input to select the object to focus by text or by touching an image of the object shown on the screen. To help the system determine which angle to aim, a user may provide a text input describing the nuance of the purpose of the video. The system may detect an object with certain angle during recording. The system determines if the camera is already in the angle that the user tries to achieve or if the camera needs some adjustment. An icon with direction marking (e.g., an arrow as shown in FIG. 8) may appear to indicate to the user which direction the camera should point. The user may adjust the camera angle according to the indication. If the user adjusts the camera angle to the desired angle according to the indication, the system may notify the user by changing the previous icon with direction marking to another icon indicating that the user succeeds. If the object moves from the current position, the direction suggestion may also be updated according to the object's changed position until the recording is over.

Figure 9:
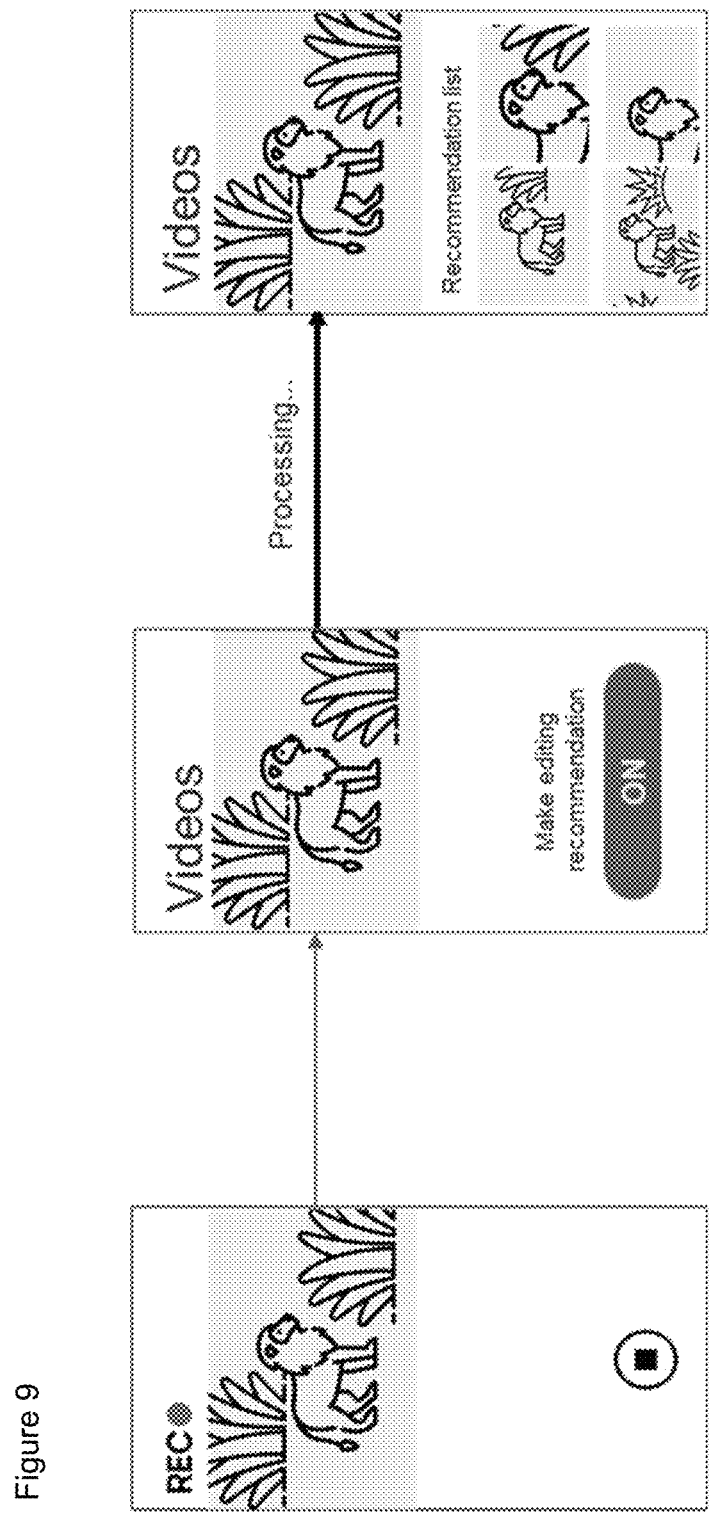
FIG. 9 illustrates an example of video editing recommendation according to an example embodiment of the disclosure.

Referring to FIG. 9, an example of using automatic video reconstruction for video editing recommendation. When a user records a video, there may be parts of the video that need to be adjusted or cut. An inadvertent event such as starting video recording too early, stopping video recording too late, or something blocking the object in the middle of the recording may occur. The disclosure may assist a user by analyzing the recording and edit the recorded video, and may create a list of edited video recommendations that the user may choose from after recording, thus removing the need for the user to edit the recorded video manually. For example, a user records a video of an object that the user wants to focus on. After recording, the user may activate editing recommendation. First, the user inputs to select the object that the user wants to focus on. The method of input varies depending on the application. For example, a user may input to select the object to focus by text or by touching an image of the object that shown on the screen. The automatic video reconstruction of the disclosure may then reconstruct the video in various ways, creating multiple versions of the video. The variation may contain moving the position of the focused object or erasing other objects that are blocking the focused object. The system may recommend the best results to the user and the user may choose whether to save one or more of the reconstructed video.

Figure 10:
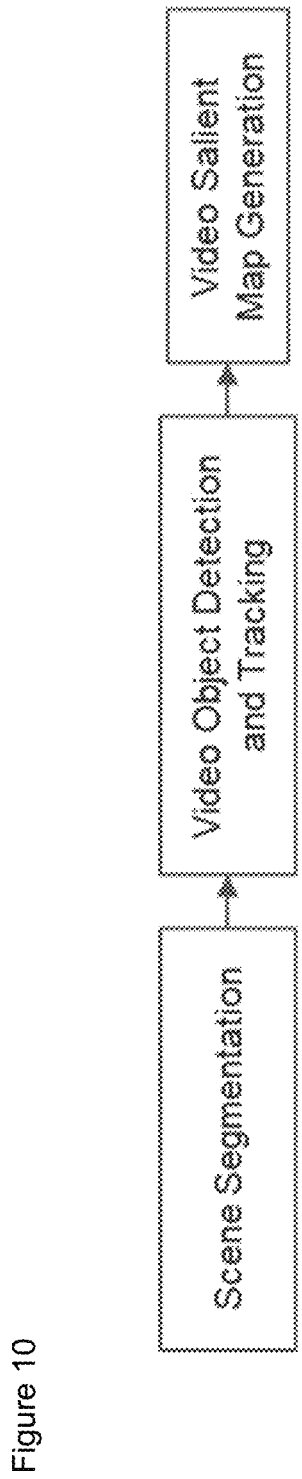
FIG. 10 is a diagram illustrating contextual video pre-processing according to an example embodiment of the disclosure.

Referring to FIG. 10 through FIG. 13, the contextual video pre-processing module is described, which includes three submodules of scene segmentation, video object detection and tracking, and video salient map generation. As shown in FIG. 10, contextual video pre-processing may segment the video into multiple scenes based on their context feature or label, and extract the object information from each scene to provide unique object label or ID. In this way, the reconstruction process may determine where a focus point is located. The output of the contextual video pre-processing module is the separated images between every detected object ID and its background from each segmented scene, based on the scene context.

Figure 11:
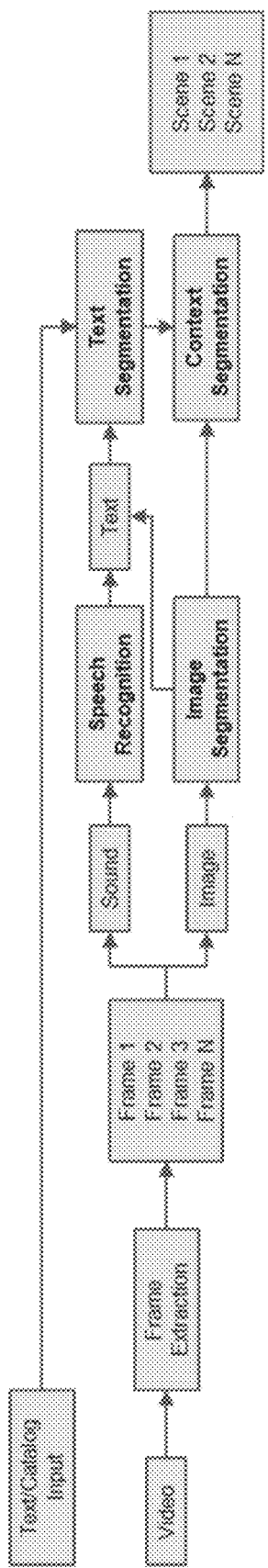
FIG. 11 is a diagram illustrating scene segmentation according to an example embodiment of the disclosure.

The scene segmentation submodule may split the video based on their context. Scene segmentation is the process to split the video for each frame and then segment the frames based on their scene context, such as colors, shape, gradient (or gradation), and text. In the scene segmentation submodule, the video is separated using two main sources, the sound and the image. In addition to these two main sources, the scene segmentation may also utilize additional text input from a user or catalog input, if available, to improve the segmented result. The final output of this scene segmentation is the segmented scene containing the paired image and text, which has similar context feature/label. As shown in FIG. 11, the system may segment the full video into several scenes. The scene segmentation submodule may include four functions. The first function is automatic speech recognition (ASR) to detect the speech of the sound source from each frame to convert the detected speech to text using text recognition. The second function is image segmentation, utilizing image recognition to segment the image source from each frame based on image properties such as shape, color, gradient, etc. and then pass the segmented image source to context segmentation to be processed. Image segmentation also recognizes text using Optical Character Recognition (OCR) from the image, such as subtitle, and then passes the text to the text recognition. The third function is text segmentation, to segment the text output based on its textual feature vector semantically. In addition to the two main sources (that is, image and audio), the system may also recognize external textual input from user or catalog input to possibly improve the result. The fourth function is context segmentation, to pair and sync the result from image Segmentation and text segmentation to produce several segmented scenes.

Figure 12:
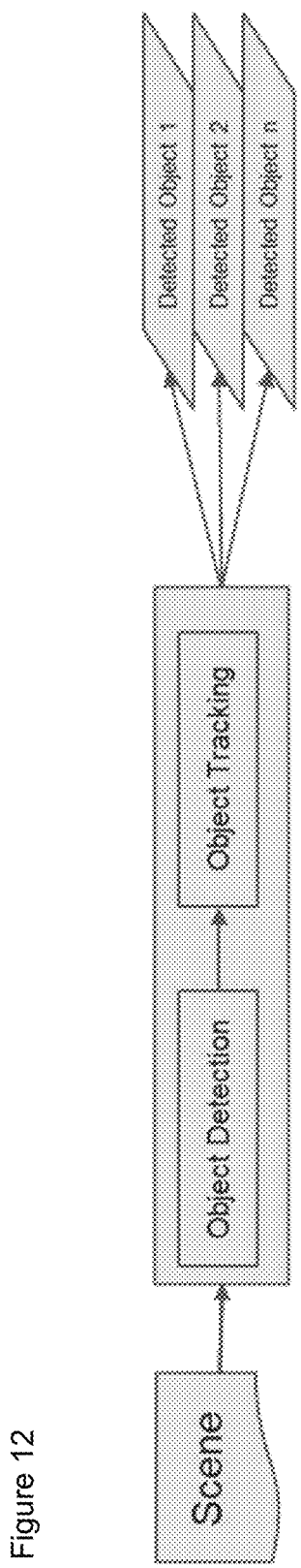
FIG. 12 is a diagram illustrating video object detection and tracking according to an example embodiment of the disclosure.

After the video is successfully segmented into several segments, the object detection and tracking may be performed to monitor the object's position and recognize the type of objects from each segment of the scene. Based thereon, the cropping and reconstruction process may determine where the focus point position is located. As shown in FIG. 12, the video object detection and tracking submodule may include two main operations, object detection and object tracking. The object detection may detect all available objects in all of the scene segments and then generate the object's information details, such as label, position, height, width, and boundary box. Object tracking may monitor all the detected objects to track their movement, such as color, size, and position.

Figure 13:
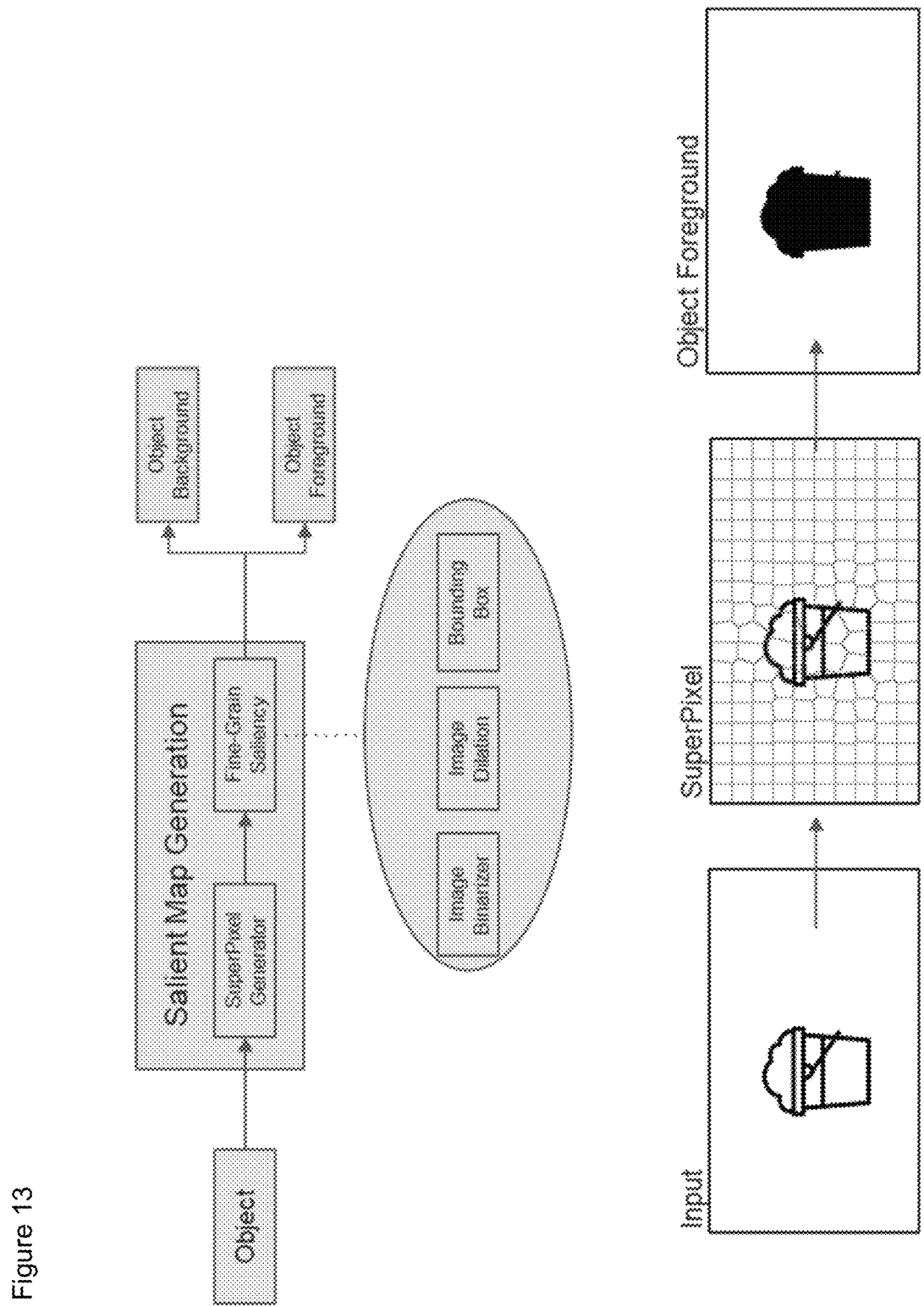
FIG. 13 is a diagram illustrating video salient map generation according to an example embodiment of the disclosure.

The video salient map generation submodule may produce separated images between the object's real shape and its background in every detected object from the video object detection and tracking submodule. As shown in FIG. 13, the video salient map generation submodule may separate the object's real shape foreground and its background, and may perform two functions, superpixel generator and fine-grain saliency. The superpixel generator may generate the superpixel to separate an object's image based on the color and distance of values in pixel regions. The fine-grain saliency may binarize the superpixel image, and then the regions of interest of the object is highlighted using a bounding box and separated from the background based on the object's real shape.

Figure 14:
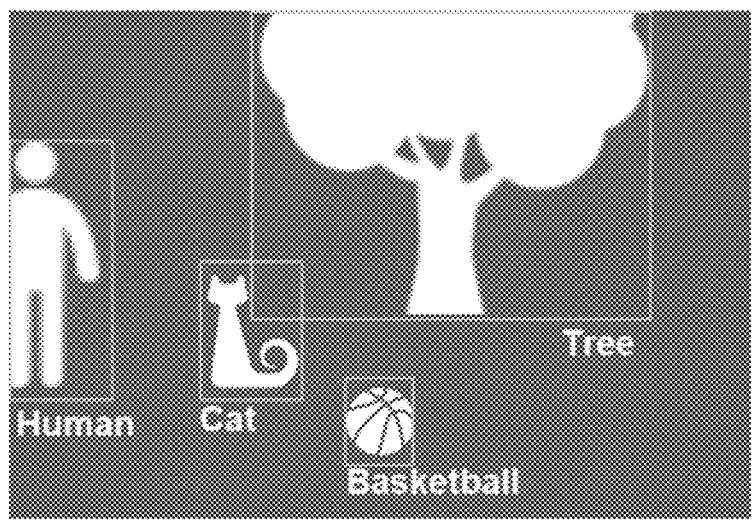
FIG. 14 is an illustration of extracted objects according to an example embodiment of the disclosure.
Figure 15:
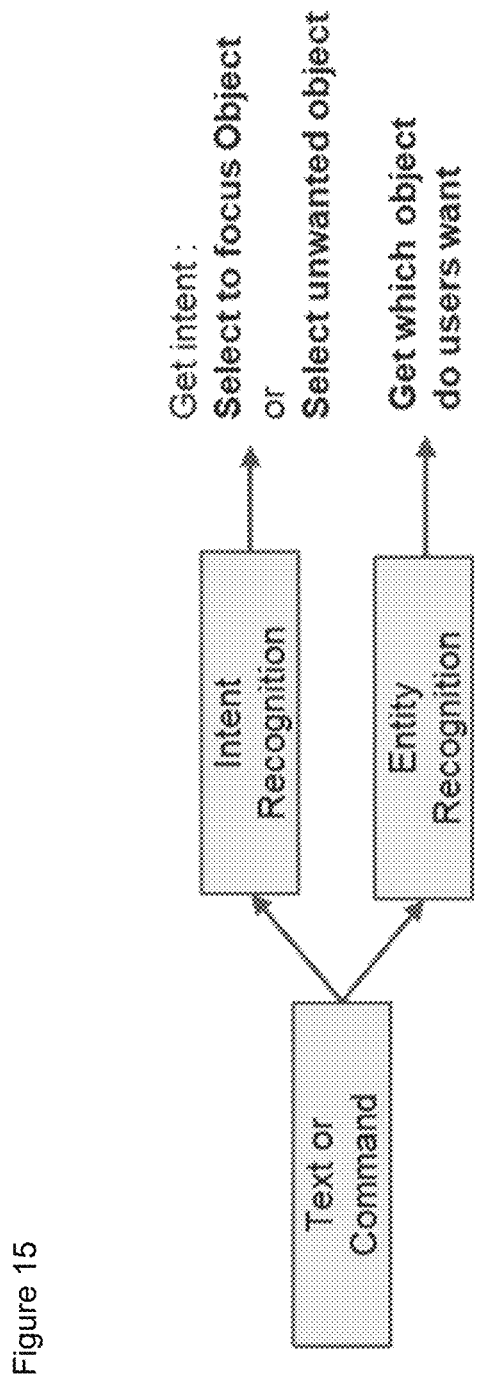
FIG. 15 is a diagram illustrating intelligent user intent recognition with natural language processing (NLP) according to an example embodiment of the disclosure.

Referring to FIG. 14 and FIG. 15, the intelligent user intent recognition module is described, which includes two submodules: a user interface and natural language understanding (NLU). As shown in FIG. 14, all objects in the video are already extracted for each scene. Then, the user interface from the system may provide a preview for choosing the object based on the first frame in the scene or in the frame in which all objects appear. As described above, the identity of the object may be tracked for each scene using the object tracking function of the video object detection and tracking submodule.

The disclosure also provides the mechanism to select a focus object and an unwanted object using NLU. As shown in FIG. 15, an example embodiment of the disclosure combines two natural language processing (NLP) mechanisms to process text or command. The first mechanism is intent recognition to find the intent of the text, whether selecting to focus on an object or selecting an unwanted object. The second mechanism is entity recognition to find the object that the user wants to select from intent recognition. The detected object may be compared to the extracted objects of the contextual video pre-processing module. Both mechanism processes may be performed using the latest technology of neural networks.

Figure 16:
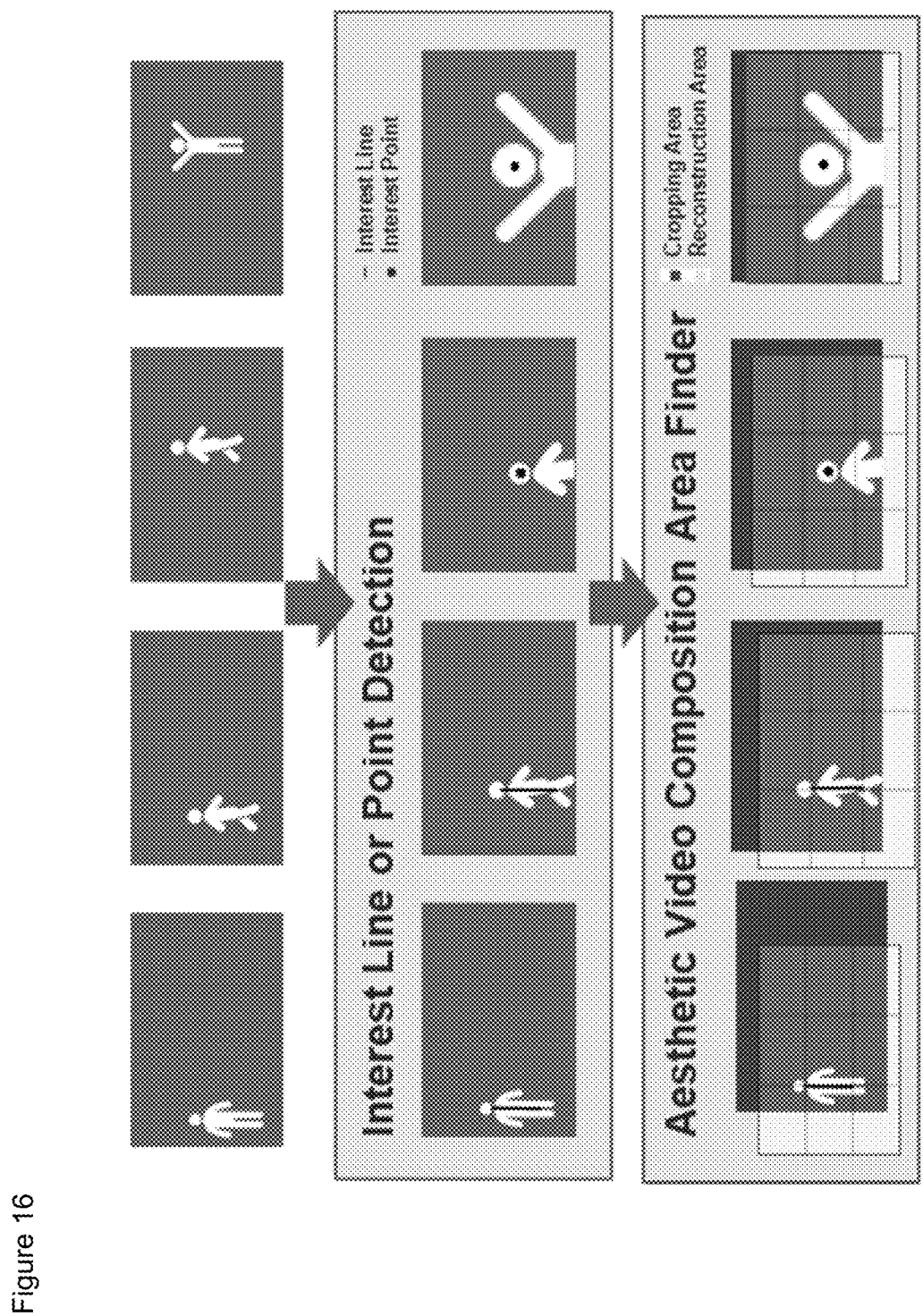
FIG. 16 is a diagram illustrating video cropping and reconstruction area finder according to an example embodiment of the disclosure.
Figure 17:
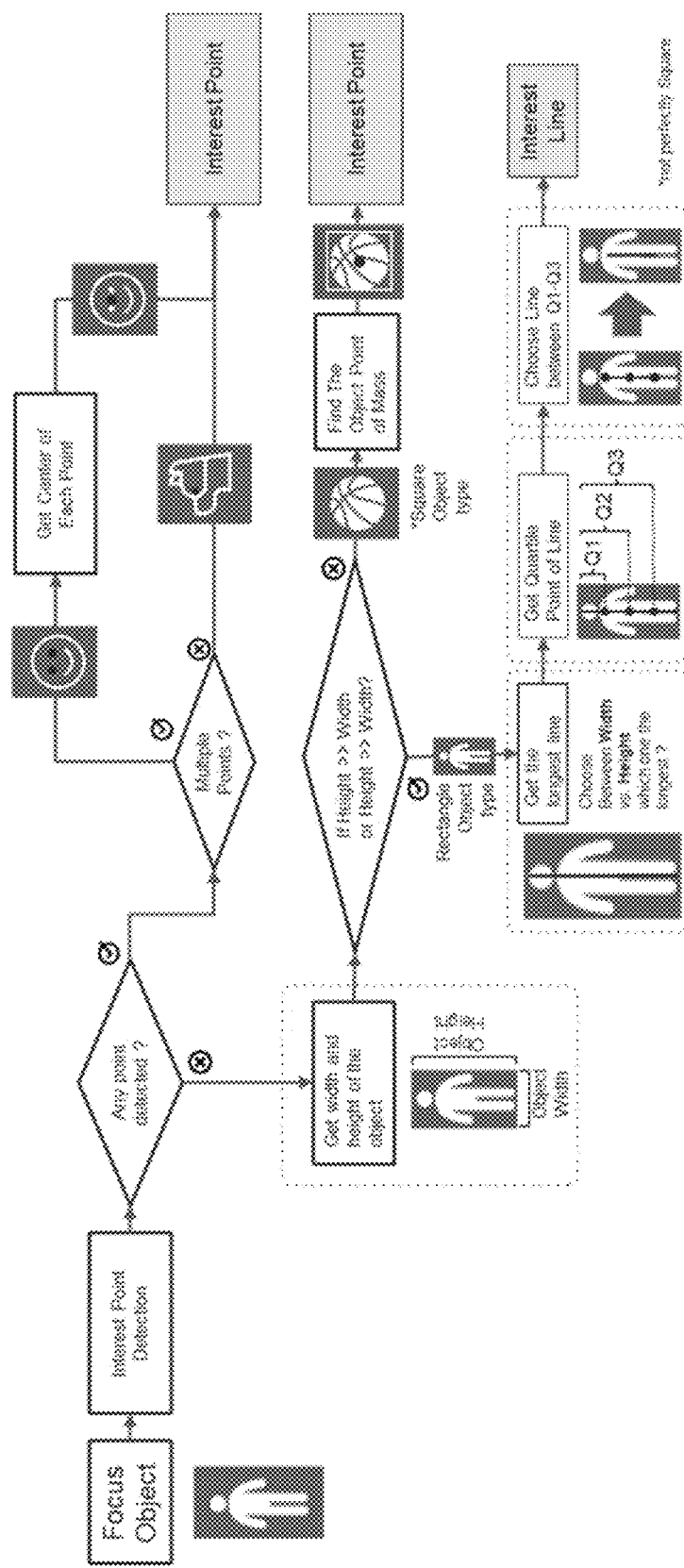
FIG. 17 is a diagram illustrating interest line or point detection according to an example embodiment of the disclosure.
Figure 18:
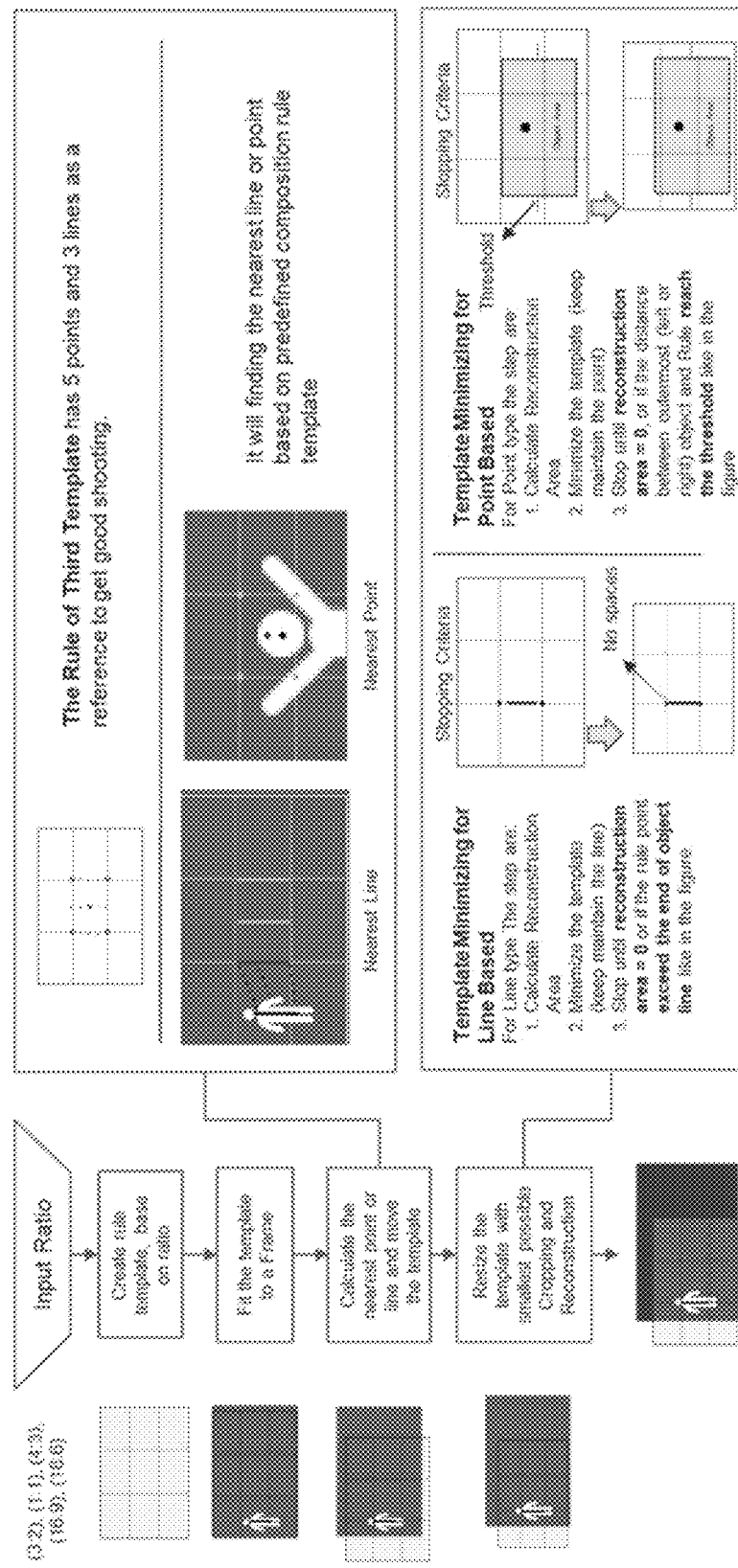
FIG. 18 is a diagram illustrating aesthetic video composition area finder according to an example embodiment of the disclosure.

Referring to FIG. 16 through FIG. 18, the video cropping and reconstruction area finder measurement according to an example embodiment is described. The video cropping and reconstruction area finder measurement may use two submodules: interest line or point detection and aesthetic video composition area finder. As shown in FIG. 16, the video cropping and reconstruction area finder measurement first finds the location of the interest line or point of the object in frame and continues to calculate the best area, which tends to include or crop per frame of the video. The disclosure may provide suggestions of out-of-an-area (hereinafter referred to as a reconstruction area) of an initial frame to be included in the frame, and may reconstruct the area using the video reconstruction module.

The interest line or point detection submodule focuses on finding an interesting point (or point of interest) from the image. The interesting point is needed as a reference to intersect with the image composition rules template. The disclosure uses a neural network to obtain the interesting point. It also handles the interest line of the object because in real-world cases the interesting point from the object may not only be defined as a point. When the interesting thing in the object tends to be a line, the model may not detect any point in the image. To solve that problem, the disclosure may manually calculate the interesting point by using simple computation. As shown in FIG. 17, to define the interesting point or line in the predefined focus object, the object is auto-selected by the system or manually selected by users. The system may detect the interesting point from the predefined focus object using the interest point detection submodule. The interest point detection submodule uses a neural network as an interest point predictor; in which the predictor is trained with image data that has been manually labeled by professionals with points of interest from its object. The neural network may learn which points from the object are important from the image.

After passing the interest point detection, the system needs to check whether there is a point detected from the object. This step may be divided into two cases. The first case is when any point is detected. In this case, the system obtain any point of interest detected from an object and may directly use the obtained point as the reference for the image composition rule. In some cases, the model may detect multiple points that are close together, and the system only uses one interest point as a reference. In this case, the model may estimate the interesting point from the center of each point. The second case is when there is no point detected. In some cases, interest point detection cannot find any point when the object is blurry or does not have any interest point on it. In this case, the system does not detect any point from the model. The system may manually calculate the interesting point by using the object's shape. If the object's shape is square, or nearly square, the system may set the point of mass from the object as an interesting point. For objects with a rectangle shape, the system may draw a line on the longest line of the shape and cut the line from Q1 to Q3 of the line, as illustrated in FIG. 17. The Q1 refers to a line cut at a point at about 25% of the longest line and the Q3 refers to a line cut at a point at about 75% of the line. The cutting of the line may be used to define the stopping criteria for the interest line, which will be described below.

The aesthetic video composition area finder measurement may find the best fits of the object with its frame and select the area of cropping and reconstruction. The area selection may be performed by intersecting the image composition rule with the interesting point or line of the object from the previous module. The disclosure may be interest point oriented, which means that the system may fit the image composition rule with the interesting point or line and does not strictly define the area only in the initial frame. The area out of the initial frame may be defined as a reconstruction area, and processed in the reconstruction module.

As shown in FIG. 18, the aesthetic video composition area finder submodule may first define the frame ratio of the video. This step is needed since different ratios may obtain different image composition proportions. The disclosure uses the rule of third template. This template is commonly used and it has 5 points and 3 lines as a reference. The system may fit the template with the frame. If the ratio between the template and the frame is different, the template may be fitted with the smaller size and discard the remaining area. Next, the system may calculate the nearest point or line with the template and straightly move the template. The nearest point calculation may use two types of calculation based on a point and a line. One type of the nearest line calculation is the rule of third template that has 3 vertical lines and 3 horizontal lines. If the interesting thing of the frame is in the form of a line, the template may be moved and intersect the nearest line in the template with the interesting line in the frame and make it on a line. Another type of the nearest point calculation is the rule of third's 5 points template. The template may be moved and intersect the interest point in frame with the nearest one.

The frame rule may resize the video with the smallest possible cropping and reconstruction. This step is needed in order to keep the aesthetic and originality of the image. It is assumed that the more frame is cropped or reconstructed, the more information may be lost. The calculation may include two types of calculation. For line-based calculation, the system may minimize the template size but may keep maintaining the line and stop when any of the defined stopping criteria is satisfied. For example, the template minimizing may stop when the reconstruction area=0, or the template point exceeds the end of the object line. For point-based calculation, the system may minimize the template size and stop when any of different stopping criteria is satisfied. The template minimizing may stop when reconstruction area=0, or if the distance between the outermost (left or right) object and the rule reaches a threshold.

Figure 19:
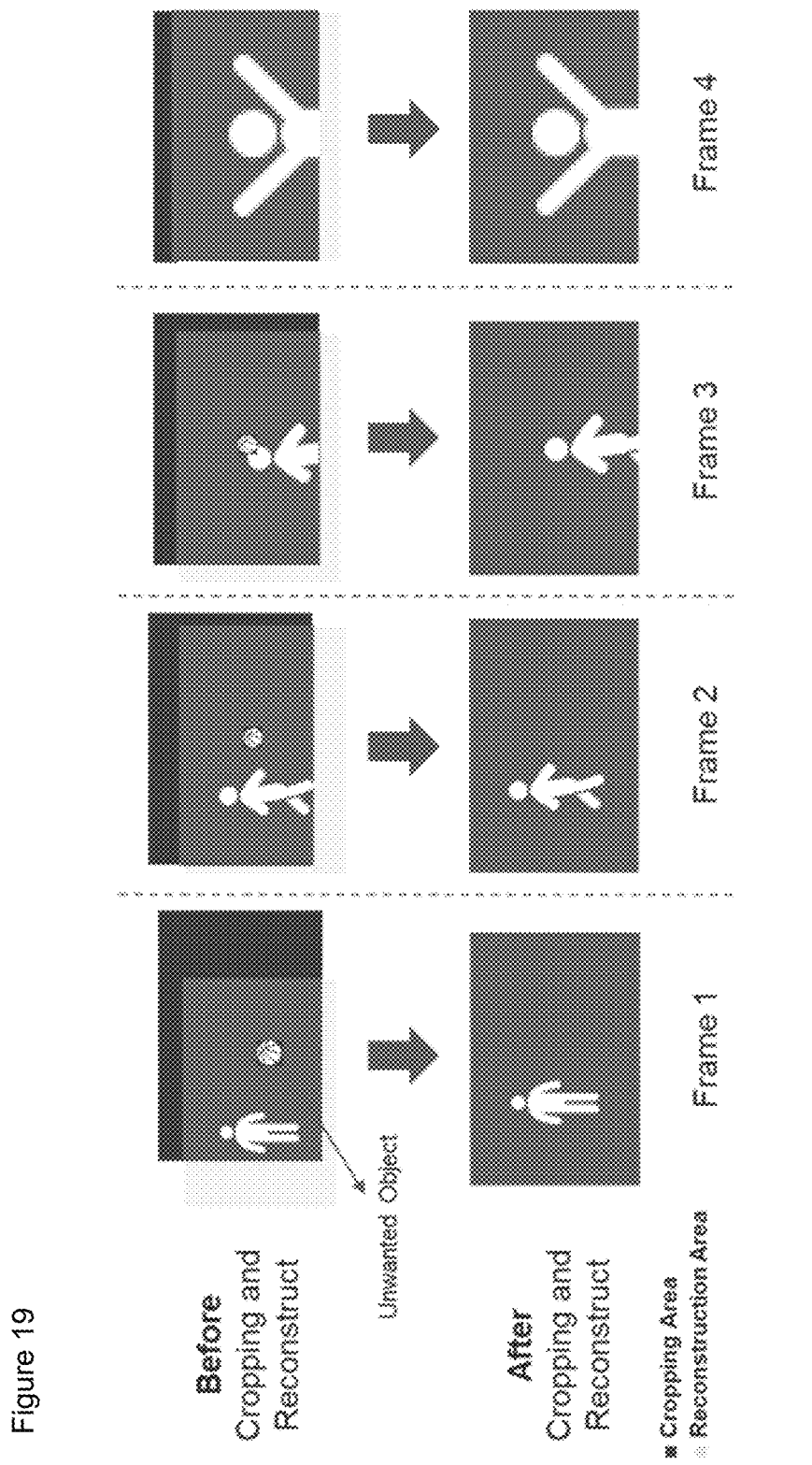
FIG. 19 is a diagram illustrating video cropping and reconstruction according to an example embodiment of the disclosure.
Figure 20:
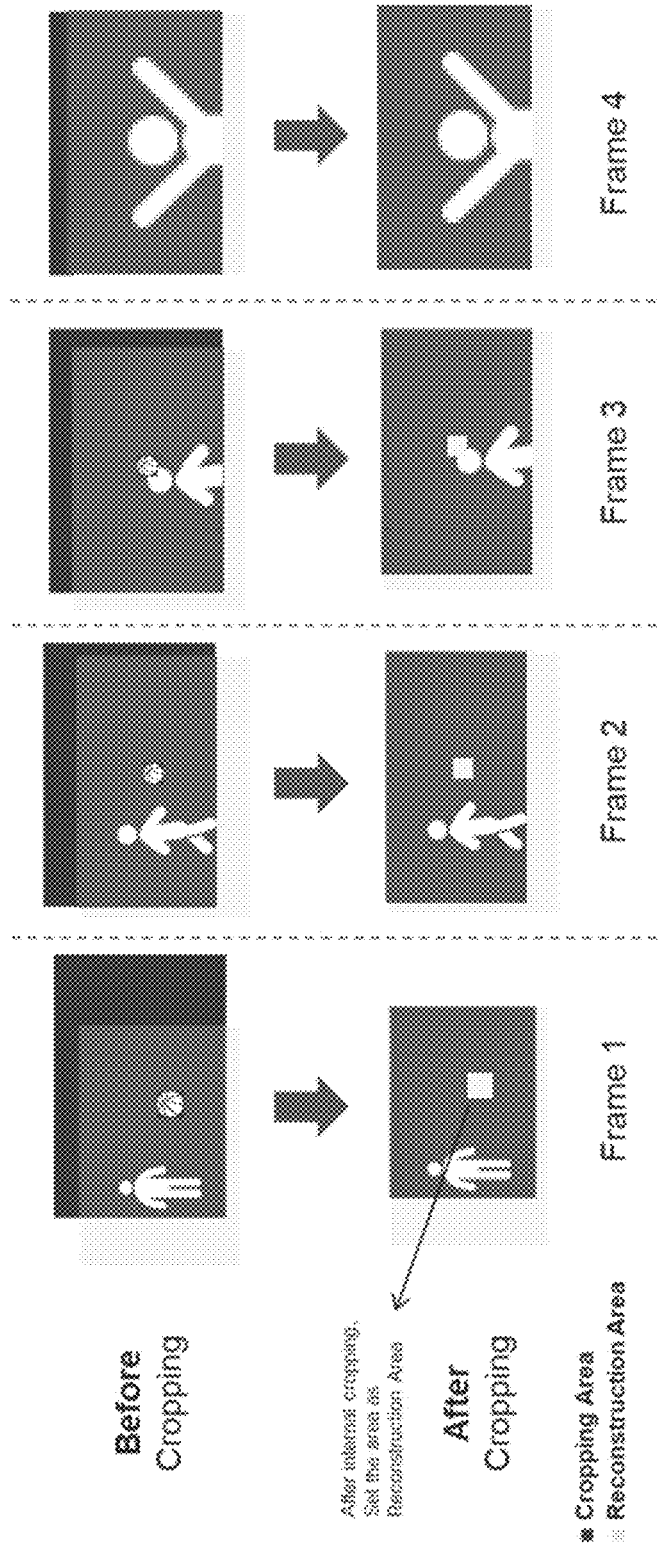
FIG. 20 is a diagram illustrating video frame cropping according to an example embodiment of the disclosure.

Referring to FIG. 19 through FIG. 21, the automatic video frame cropping and reconstruction module according to an example embodiment is described. As shown in FIG. 19, the system may crop the dark grey areas and reconstruct the light grey area using the reconstruction method. This process may run for each frame in the video. This module may include two submodules with different processes of cropping and reconstruction. The first submodule is video frame cropping. As shown in FIG. 20, the video frame cropping submodule only focuses on cropping the cropping area from the previous module. The cropping areas are the unwanted objects area and the unimportant area gathered from the previous module. For example, this submodule may crop the dark grey areas, and add the light grey area to indicate that area as the reconstruction area.

As shown in FIG. 21, all light grey areas from the video frame cropping submodule may be constructed using the video frame reconstruction submodule. For reconstructing the video, the disclosure adopts the "Deep Flow-Guided Video Inpainting" by Xu et al, which includes two processes, flow estimation and video inpainting. The flow estimation is to estimate contour in the missing region in a video. The flow estimation may be performed by capturing the contour relation between frames. Both forward and backward video frames relation is captured to estimate contour in the missing region. This flow may be estimated in three stages, from coarse to fine flow maps estimation. All of the stages may be performed for forward and backward frames. After the flow estimation is performed, pixel movement needs to be tracked from frame to frame to paint the estimated flow. If pixel movement moves below a certain threshold, it may be considered as the same pixel. This method is applied to forward and backward frames. After that, it combines prediction from forward and backward frames. For the area that is still empty, it may be filled using the image inpainting neural network.

As described above, the disclosure has four main features, which are advantageous than conventional scheme.

Firstly, the disclosure may apply computational video editing to perform scene segmentation utilizing context-based segmentation and intent-based analysis, extract the feature of video, perform object tracking to obtain consistent frame focus, and apply a salient map generation feature to facilitate object and foreground distinction, by:
  Splitting the video into each frame and then segment the frames based on their similar property like colors, shape, gradient, sound etc.;
  Separating the video using two main sources, the sound and the image;
  Utilizing text as additional input from user, or catalog input, if available, to improve the segmented result;
  Detecting all available objects on each scene segment to generate information details such as label, position, height, width, and boundary box;
  Monitoring all the detected object to track the movement of object based on color, size and position; and
  Generating video salient map to produce separated image between the object's real shape and its background.

Secondly, the disclosure may enable a user to select a focus object (or object of interest) and an unwanted object to delete, by:
  Utilizing a user interface to provide a video preview that enables a user to select the object to focus or delete;

Applying Natural Language Understanding (NLU) as a mechanism to select the focus object and unwanted object; and Combining two Natural Language Processing (NLP) mechanisms to process text or command by recognizing intent or entity.

Thirdly, the disclosure may measure the video cropping and reconstruction area finder, by:

Finding the best view area of the frame by its object in the frame;

Reconstructing the area by cropping un-meaningful area to create a better view of the frame;

Applying image composition rules as a reference to define the aesthetic of a frame;

Calculate the nearest point or line based on the predefined composition rule, by gathering all interesting point or line from an object and set it as a focal point to intersect it with the image; and Using neural network mechanism to predict the interesting point and calculate the interesting point of object's shape manually when the model is unable to detect any point from the object.

Fourthly, the disclosure may estimate the flow of video based on image flow between frames and perform inpainting to the video based on flow estimation, by:

Estimating flow by capturing the contour relation between frames to estimate the contour in the missing region in a video;

Generating the estimated contour in every frame;

Painting each of the estimated contours as natural as possible by determining the pixels that may fill the flow maps based on the changes of pixel position; and Filling the empty area using image inpainting neural network.

From the extracted feature, the focal object and unwanted object by may be selected automatically by the system or manually by the user. The disclosure gives the users options to choose those areas by manually clicking the object or using natural language understanding. After defining the focused object, the system may find the best area for cropping and reconstruction by calculating the interest line or point detection from the focused object and using aesthetic video composition area finder module. The said module may calculate the best area using popular composition rules, which is proven to make video or image more aesthetic. This module is performed for each frame in the video.

The predefined area for cropping and reconstructing may be processed in the video frame cropping reconstruction module. In this module, unwanted object area and cropping area may be cropped and filled to reconstruct the area. After the cropping process, the system may reconstruct those areas using the video frame reconstruction area. The system uses the latest video reconstruction method that combines flow estimation and video in-painting method. This process is also performed for each frame in the video.

The system and the method according to the disclosure automatically generate video reconstruction with a dynamic point of interest by calculating a point or line of interest to be utilized as a reference point in the video composition rules, by identifying the best area for cropping and then performing reconstruction automatically and/or providing video reconstruction recommendation using user's predefined focus object. The disclosure may assemble deep learning methods and utilize neural processing unit to automatically reconstruct a video. The various modules inside the said system include: contextual video pre-processing module that extracts the feature of video, perform object tracking to obtain consistent frame focus, and apply a salient map generation feature to facilitate object and background distinction, by applying several techniques on classical machine learning or deep learning frameworks such as neural network. The process performs for each scene that is separated by the context-based scene segmentation module that combines textual context understanding and frame image similarity analysis technique. Another module included in the system is an intelligent user intent recognition module that allows a user to select the preference focus object from extracted object(s) from the video. A user may also select unwanted object from the video, and the system may crop the unwanted object. Another module included in the system is a video cropping and reconstruction area finder measurement module to calculate the best area, whether to crop or reconstruct; utilizing the composition quality of a video by gathering all the interesting point or line from an object in a video scene, set it as a focal point, and calculates the nearest point or line based on the predefined image composition rule. The image composition rules may be used as a reference to define the aesthetic of a video frame by positioning the interest point or line in the intersection or along the lines of video composition rules, in which an object in a video frame becomes more balanced and makes the generated view of the video frame more natural. Another module included in the system is an automatic video frame cropping and reconstruction module based on sequence techniques applied for each frame of a video, to crop and reconstruct the predefined area.

The system may apply contextual video pre-processing and comprise the following entities: a video preprocessing module that extracts the feature of video by segmenting the contextual scene to perform object tracking to get consistent frame focus, and apply a salient map generation feature to facilitate object and foreground distinction for each scene. This module includes three submodules: (i) scene segmentation submodule to split or segment the video for each contextual scene. This submodule may split the video for each frame and then segment the frames based on their similar property like colors, shape, gradient, sound etc. The video is then separated using two main sources, the sound and the image. Besides those two main sources, the scene segmentation also utilizes additional text input from user/catalog input if available to improve the segmented result. In the end, the image segmentation and text segmentation may be combined to get more contextual scene segmentation; (ii) video object detection and tracking submodule to monitor the object's position and recognize the type of object from each segment of the scene with the following details—object detection: detects all available objects on all of the scene segments and then generate the object's detail information such as label, position and boundary box; object tracking: monitors all the detected object by the system to track the object's movement (color, size, position); and (iii) video salient map generation submodule to ensure foreground and background are separated and help to define which object may be defined as focus object in a frame.

The scene segmentation may combine the image segmentation and text segmentation, the system may perform the following: Utilize Automatic Speech Recognition (ASR) to detect the speech from the sound source of each frame and convert it to text; Apply Image Segmentation to segment image source from each frame based on image properties, such as shape, color, gradient, etc. The image segmentation also recognizes the text using Optical Character Recognition (OCR) from the image; Use Text Recognition to process the text output resulted from ASR and Image Segmentation to recognize its textual feature vector semantically. Besides image and audio, Text Recognition also recognizes the textual input from user or catalog input to improve the result; Apply Context Segmentation by pairing and synchronizing all outputs resulted from Image Segmentation and Text Recognition to produce the segmented scenes.

The system may apply intelligent user intent recognition using the latest neural networks technology, and comprise the following entities: There are two methods to select the focus object and unwanted object in the video: A user Interface, to show the preview when choosing the focused or unwanted object, based on the first frame in the scene or in the frame that all objects have occurred. The disclosure utilizes object tracking, which allows the identity of the object to be tracked all the time for each scene; Natural Language Understanding, by combining two Natural Language Processing mechanisms to process text or command. The first mechanism is Intent Recognition, utilized to find the intent of the text when selecting to focus on an object or remove it as unwanted object. The other mechanism is Entity Recognition, utilized to find the objects that users want to select for the operation from intent recognition. The detected object may be compared to the extracted objects from the previous module.

The system may apply video cropping and reconstruction area finder video cropping and reconstruction area finder measurement, and comprise the following entities: interest line or point detection submodule focuses on gathering the interesting point or line from an object and set it as a focal point to intersect it with the video composition rules; wherein the interesting point or line in the predefined focus object is automatically selected from the system utilizing neural networks. In the case that any interesting point or line of an object is detected by the system, then the system may directly use it as the reference for the image composition rule. In some cases, the model may detect multiple points that are close together and the system only use one interest point as a reference. To handle this, the interesting point may be approximated from the center of each point. In the case that there are no point and/or line of interest detected by the system, then the system may calculate the interesting point and/or line of interest through object shape detection: Square shaped object: If the object has a square shape or nearly square, the system sets the point of mass from the object as an interesting point. Rectangle shaped object: For this type of shape, the system may draw a line on the longest line of the shape and cut the line from Q1 to Q3 of the line. The Q1 may be a line cut at a point 25% of the longest line and the Q3 may be a line cut at a point at 75% of the longest line. The cutting may be used to define the stopping criteria for the interest line. The aesthetic video composition area finder submodule fits the previous interest point or interest line and finds the best fits the object with its frame and choose area of cropping and reconstruct. The submodule may calculate the nearest point or line based on the predefined composition rule, by gathering all interesting point or line from an object and set it as a focal point to intersect it with the image to composition rules point or line, and re-sizes the frame rule with smallest possible cropping and reconstruction.

The video cropping and reconstruction area finder measurement comprises the following steps: Define the frame ratio of the video; this step is needed because different ratios may get different image composition proportions. It uses the rule of third template, which is commonly used and it has 5 points and 3 lines as a reference; Fit the template with the frame and if the ratio between the template and the frame is different, the template may fit it with the smaller size and left the remaining area; Calculate the nearest point or line with the template and straightly move the template. For the nearest calculation, the calculation may include two types of calculation: Nearest Line Calculation, for the line calculation uses the rule of third template has 3 vertical lines and 3 horizontal lines. If the interesting thing of the frame is in form of a line, the template is moved to intersect the nearest line in the template with the interesting line in the frame and make it on a line; Nearest Point Calculation, for the point calculation uses the rule of third has 5 points. The template is moved and intersect the interest point in frame with the nearest one; The Frame Rule may resize with the smallest possible cropping and reconstruction. This step is needed to keep the aesthetic and originality of the image, the more frame was cropped or reconstruct the more information has been lost. In this step, the calculation may include two types of calculation: Line-based, where the system may minimize the template size but keep maintain the line and stop when the stopping criteria is satisfied. The minimizing may stop when the reconstruction area=0 or the template point exceeds the end of the object line; Point-based, same as the line based, the system may minimize the template size but with different stopping criteria. The minimizing may stop when reconstruction area=0 or if the distance between the outermost (left or right) object and Rule reach the threshold.

The system may apply automatic video cropping and reconstruction, including sequence of techniques performs for each frame of video: Automatic video cropping and reconstruction method may crop the unwanted area whether on the edge of frame or in the middle of frame which is selected manually by user. For the unwanted area in the middle of frame, it may be set as a reconstruction area after the area is cropped. Flow Estimation method is used to estimate contour in the missing region in a video. Both forward and backward video frames relation is captured to estimate contour in the missing region. After this process, then the estimated contour in every frame has been generated. The next step is to paint each of the estimated contour as natural as possible by applying neural network based in painting method; Video Reconstruction method may reconstruct the reconstruction area. The reconstruction method may use the deep learning method. For example, the disclosure uses Flow Estimation to estimate the flow of video based on image flow between frames, and Video In-painting to perform In-painting to the video based on flow estimation. Video In-painting submodule may paint each of the estimated contour as natural as possible by determining which pixels that may fill the flow maps based on the changes of pixel position. If the changes are below certain threshold, the pixel is considered part of the unseen part of the video. This method is done on backward and forward frame arrangement to capture all relevant pixels, then to combine the estimated pixels per frame from backward and forward calculation on preceding step. The area that still empty may be filled by image in-painting neural network.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

While the disclosure has been described with reference to example embodiments thereof, it will be apparent to those of ordinary skill in the art that various changes and modifications may be made thereto without departing from the spirit and scope of the disclosure as set forth in the following claims and their equivalents.

The invention claimed is:

1. A method of automatically generating video reconstruction, the method comprising:
dividing a first video into a plurality of first frames;
determining a first object of interest in the plurality of first frames based on a user selection on a user interface or based on an intent recognition module using a natural language processing, wherein the user interface provides a preview of objects present in the plurality of first frames, and wherein the intent recognition module processes a text to determine whether an intent of the text is selecting to focus on a particular object or selecting an unwanted object;
converting the plurality of first frames into a plurality of second frames based on the first object of interest; and
reconstructing the first video into a second video based on the plurality of second frames,
wherein, in a case of determining the first object of interest based on the intent recognition module, the converting the plurality of first frames comprises:
extracting at least one of a point of interest or a line of interest for the first object of interest included in a first frame of the plurality of first frames; and
if the intent of the text is selecting the unwanted object, deleting the first object of interest from the plurality of first frames to obtain the plurality of second frames not including the first object of interest; or
if the intent of the text is selecting to focus on the particular object, reconstructing the first frame based on the at least one of the point of interest or the line of interest to obtain the plurality of second frames including the first object of interest.

2. The method according to claim 1, wherein the dividing the first video comprises:
dividing the first video into a plurality of scenes based on images included in the first video or a text externally input, and
wherein the determining the first object of interest comprises:
detecting a second object included in the plurality of scenes and tracking the second object; and
classifying a foreground and a background in the plurality of scenes, and determining the second object as the first object of interest based on a result of the classifying.

3. The method according to claim 2, wherein the dividing the first video into the plurality of scenes comprises:
detecting voices included in the plurality of first frames through automatic speech recognition (ASR), and converting the voices into text;
dividing the images included in the plurality of first frames based on at least one of a color, a shape, or a gradation of each of the images; and
generating a feature vector for each of the converted text and the divided images, and dividing the first video into the plurality of scenes based on the feature vector.

4. The method according to claim 1, wherein the determining the first object of interest comprises:
determining the first object of interest based on an intent recognition and an entity recognition.

5. The method according to claim 1, wherein the converting the plurality of first frames comprises:
extracting at least one of a point of interest or a line of interest for a third object included in the first frame of the plurality of first frames; and
cutting the third object included in the first frame or reconstructing the first frame based on the at least one of the point of interest or the line of interest.

6. The method according to claim 5, wherein the reconstructing the first frame comprises:
fitting a template to the first frame, the template including five points and three straight lines; and
moving the template such that the point of interest or the line of interest is adjacent to or coincides with the five points or the three straight lines.

7. The method according to claim 1, wherein the converting the plurality of first frames comprises:
removing a partial region of the first frame of the plurality of first frames;
generating a second frame of the plurality of second frames by painting a missing area resulted from removal of the partial region; and
arranging adjacent second frames by applying in-painting and flow estimation to the plurality of second frames.

8. A system for automatically generating video reconstruction, the system comprising:
a display configured to output a first video, and output a second video in which the first video is reconstructed; and
a processor configured to process data for the first video and reconstruct the second video,
wherein the processor is further configured to divide the first video into a plurality of first frames, determine a first object of interest from the plurality of first frames, and divide the plurality of first frames into a plurality of second frames based on the first object of interest, and reconstruct the first video into the second video based on the plurality of second frames,
wherein the processor is further configured to determine the first object of interest based on a user selection on a user interface or based on an intent recognition module using a natural language processing, wherein the user interface provides a preview of objects present in the plurality of first frames, and wherein the intent recognition module processes a text to determine whether an intent of the text is selecting to focus on a particular object or selecting an unwanted object,
wherein, in a case of determining the first object of interest based on the intent recognition module, the processor is further configured to convert the plurality of first frames by performing:
- extracting at least one of a point of interest or a line of interest for the first object of interest included in a first frame of the plurality of first frames; and
- if the intent of the text is selecting the unwanted object, deleting the first object of interest from the plurality of first frames to obtain the plurality of second frames not including the first object of interest; or
- if the intent of the text is selecting to focus on the particular object, reconstructing the first frame based on the at least one of the point of interest or the line of interest to obtain the plurality of second frames including the first object of interest.

9. The system according to claim 8, wherein the processor is further configured to divide the first video into a plurality of scenes based on images included in the first video or a text externally input; detect a second object included in the plurality of scenes and tracking the second object; and classify a foreground and a background in the plurality of scenes, and determining the second object as the first object of interest based on a result of classification.

10. The system according to claim 9, wherein the processor is further configured to detect voices included in the plurality of first frames through automatic speech recognition (ASR), and converting the voices into text, divide the images included in the plurality of first frames based on at least one of a color, a shape, or a gradation of each of the images; and generate a feature vector for each of the converted text and the divided images, and divide the first video into the plurality of scenes based on the feature vector.

11. The system according to claim 8, wherein the processor is further configured to determine the first object of interest based on an intent recognition and an entity recognition.

12. The system according to claim 8, wherein the processor is further configured to extract at least one of a point of interest or a line of interest for a third object included in the first frame of the plurality of first frames; and cut the third object included in the first frame or reconstructing the first frame based on the at least one of the point of interest or the line of interest.

13. The system according to claim 12, wherein the processor is further configured to fit a template to the first frame, the template including five points and three straight lines; and move the template such that the point of interest or the line of interest is adjacent to or coincides with the five points or the three straight lines.

14. The system according to claim 8, wherein the processor is further configured to remove a partial region of the first frame of the plurality of first frames, generate a second frame of the plurality of second frames by painting a missing area resulted from removal of the partial region; and arrange adjacent second frames by applying in-painting and flow estimation to the plurality of second frames.

15. A computer program product comprising a non-transitory computer-readable medium storing instructions that, when executed by at least one hardware processor, cause the at least one hardware processor to perform operations comprising:
- dividing a first video into a plurality of first frames;
- determining a first object of interest in the plurality of first frames based on a user selection on a user interface or based on an intent recognition module using a natural language processing, wherein the user interface provides a preview of objects present in the plurality of first frames, and wherein the intent recognition module processes a text to determine whether an intent of the text is selecting to focus on a particular object or selecting an unwanted object;
- converting the plurality of first frames into a plurality of second frames based on the first object of interest; and
- reconstructing the first video into a second video based on the plurality of second frames,
- wherein, in a case of determining the first object of interest based on the intent recognition module, the converting the plurality of first frames comprises:
- extracting at least one of a point of interest or a line of interest for the first object of interest included in a first frame of the plurality of first frames; and
- if the intent of the text is selecting the unwanted object, deleting the first object of interest from the plurality of first frames to obtain the plurality of second frames not including the first object of interest; or
- if the intent of the text is selecting to focus on the particular object, reconstructing the first frame based on the at least one of the point of interest or the line of interest to obtain the plurality of second frames including the first object of interest.

* * * * *